United States Patent
Kwan et al.

(10) Patent No.: US 12,259,359 B2
(45) Date of Patent: Mar. 25, 2025

(54) APPARATUS FOR INSPECTING THE CONDITION OF THE PIPEWALL OF A PIPELINE

(71) Applicant: Pure Technologies U.S. Inc., Columbia, MD (US)

(72) Inventors: Jeffrey Chak-Fai Kwan, Calgary (CA); Hongwei Zhang, Calgary (CA); Ran Wu, Calgary (CA); Xiangjie Kong, Calgary (CA)

(73) Assignee: Pure Technologies U.S. Inc., Columbia, MD (US)

( * ) Notice: Subject to any disclaimer, the term of this patent is extended or adjusted under 35 U.S.C. 154(b) by 668 days.

(21) Appl. No.: 17/336,522

(22) Filed: Jun. 2, 2021

(65) Prior Publication Data
US 2021/0372970 A1    Dec. 2, 2021

Related U.S. Application Data

(60) Provisional application No. 63/033,615, filed on Jun. 2, 2020.

(51) Int. Cl.
*G01N 29/22* (2006.01)

(52) U.S. Cl.
CPC ... *G01N 29/223* (2013.01); *G01N 2291/0289* (2013.01); *G01N 2291/106* (2013.01); *G01N 2291/2636* (2013.01)

(58) Field of Classification Search
CPC .. G01N 29/223; G01N 29/225; G01N 29/265; G01N 29/043; G01N 2291/0289; G01N 2291/106; G01N 2291/2636
USPC .......................................................... 73/592
See application file for complete search history.

(56) References Cited

U.S. PATENT DOCUMENTS

| | | | |
|---|---|---|---|
| 5,460,046 A | 10/1995 | Maltby et al. | |
| 6,725,721 B2 | 4/2004 | Venczel | |
| 7,164,476 B2* | 1/2007 | Shima | G01N 21/954 |
| | | | 250/559.07 |
| 9,128,019 B2* | 9/2015 | Wayman | G01N 17/02 |
| 9,233,466 B2* | 1/2016 | Skrinde | B25J 9/08 |
| 10,527,590 B2* | 1/2020 | Norli | G01N 29/262 |
| 11,773,716 B2* | 10/2023 | Shand | G01B 7/281 |
| | | | 324/220 |
| 2005/0126316 A1 | 6/2005 | Richter et al. | |

(Continued)

FOREIGN PATENT DOCUMENTS

WO    WO 2020/028990 A1    2/2020

OTHER PUBLICATIONS

International Search Report and Written Opinion; Issued Sep. 15, 2021; PCT/CA2021/050752; Filed Jun. 2, 2021.

*Primary Examiner* — Jacques M Saint Surin
(74) *Attorney, Agent, or Firm* — Stanek Lemon Crouse & Meeks, PA

(57) ABSTRACT

There is provided a pipeline inspection apparatus and an ultrasonic module for use in a pipeline inspection apparatus, the module comprising: ultrasonic transducers configured to assess the condition of a pipeline; and an elongate body including a front end and a rear end opposed to the front end, the body configured to mount the ultrasonic transducers around the circumference of the elongate body aligned along adjacent transverse planes wherein the ultrasonic transducers aligned along one transverse plane are rotationally offset from the ultrasonic transducers aligned along an adjacent transverse plane.

21 Claims, 23 Drawing Sheets

(56) References Cited

U.S. PATENT DOCUMENTS

2011/0167914 A1 7/2011 Sutherland
2019/0360976 A1 11/2019 Frueh et al.

* cited by examiner

BODY TILT (PITCH)   OFF CENTER   ROTATION

APPARATUS FOR INSPECTING THE CONDITION OF THE PIPEWALL OF A PIPELINE

CROSS REFERENCE TO RELATED APPLICATIONS

This application claims the benefit of the priority of U.S. Provisional Patent Application No. 63/033,615, filed Jun. 2, 2020, the contents of which are incorporated herein by reference.

TECHNICAL FIELD

The present invention relates to an apparatus and method for inspecting the condition of the pipewall of a pipeline.

BACKGROUND

It is known to use flexible pipeline inspection devices that are carried by liquid in a conduit or pipeline to assess the condition of the walls of the pipeline. In general, the flexible design allows it to be inserted and extracted through existing laterals, risers and access manways where historically, similar sensor technologies would require full diameter pipe access which often required excavation. The flexibility of the tool also allows the tool to navigate inline features such as valves, bends, wyes and tees. The tool can collapse to transverse butterfly and plug valves where previous full diameter tools would have issues traversing.

Ultrasonic transducers can be used to assess the condition of the walls of the pipeline, and such transducers utilize time-of-flight of an acoustic pulse from each transducer to gather multiple reflections from the pipe wall to determine the wall condition of the specific area targeted.

As shown in FIG. 1 (left panel), when a pulsed acoustic wave is fired at a set frequency as various intervals towards the pipeline wall, the first reflection from the inner pipe wall reveals the distance measurement from the transducer to the wall. All the first reflection data from the other transducer reveals the out-of-roundness of the pipeline. If a liner is present, the second reflection would bounce off the liner and metal wall interface. This would reveal the liner thickness and possible delamination. The next reflection would bounce off the outer diameter of the metal wall to reveal the wall thickness and wall loss of the target area. Multiple reflections will appear after as the signal is bounced within each layer until the signal is attenuated.

The second panel shows center beam misalignment and the third panel represents the acoustic energy footprint for the cone-shaped beam. The footprint when the sound arrives at the inner pipe wall is the yellow area, then it propagates due to refraction to the dark gray area at the back wall, and propagates again after a reflection into the light gray area. Since the light gray area still overlaps with the transducer region, this would represent a weaker signal. In cases where the alpha angle is great enough, the footprint would be outside the green oval which would represent a lost signal.

As shown in FIGS. 2, 3 and 4, for the firing transducer to receive the strongest reflected signal back from the wall, the ultrasonic transducer should be aligned with the target. As shown in FIG. 2 which shows the sound intensity profile as the signal propagates, when the firing angle of transducer increases, the reflected return signal received by the transducer weakens to the point where no signal is received.

The use of free-swimming flexible pipeline inspection devices with ultrasonic transducers may encounter certain difficulties. As shown in FIG. 3, the angle of the reflection is related to the change in the axis of the transducer module relative to the pipeline axis in the tilt and off centering. Rotation of the module can also affect the signal by skewing the data, and in some cases this problem can be mitigated using a weighted keel to prevent rotation. As well, buoyancy changes can be caused by urethane water saturation and trapped air within the outer cavities of the tool during the pre-insertion balance process are known to affect the centering of the apparatus during inspection. Other factors that can affect the centering of the transducer module may include the supporting elements such as the petal rest angle, deflection and molded length tolerances and tow link alignment tolerance. Some environmental factors that can also affect the centering of the transducer module in the pipeline may include air pockets, out of roundness, diameter variance, debris and tuberculation and feature passages of valves, bends and tees.

The effects of off centering of the transducer module relative to the center axis of the pipe are shown in FIG. 4. FIG. 4 is a plot where x-axis shows the number of data points and there are roughly 104 data points per second and the y-axis is also in number of points, and in the y direction there are 10, 12 or 15 million points per second depending on the tool data acquisition configuration. The variation in the y-axis between the plots are due to the signal being received at different time delay from the emission of the signal, which corresponds to the different distances and where values of 0%, 1%, 2%, and 3% are the deviations of off-centering measured as a percentage of the pipeline diameter. From FIG. 4, it can be seen that the optimal target centralization of the ultrasonic module can be within about 1.5% of the pipeline diameter in order to collect optimal data.

Accordingly, there is a need to provide an apparatus and a method that optimizes the placement of the ultrasonic transducers when using a free-swimming pipeline device to assess the pipe wall condition when the apparatus is deployed into a pipeline containing a liquid.

SUMMARY OF THE INVENTION

It is an embodiment of the present invention to provide an ultrasonic module for use in a pipeline inspection apparatus, the module comprising: ultrasonic transducers configured to assess the condition of a pipeline; and an elongate body including a front end and a rear end opposed to the front end, the body configured to mount the ultrasonic transducers around the circumference of the elongate body aligned along adjacent transverse planes wherein the ultrasonic transducers aligned along one transverse plane are rotationally offset from the ultrasonic transducers aligned along an adjacent transverse plane.

It is an embodiment of the present invention to provide a pipeline inspection apparatus for inspecting the condition of a pipeline when deployed into a pipeline containing a liquid, the apparatus comprising: an ultrasonic module; and a plurality of circumferentially spaced wall spacers configured to contact the wall of the pipeline.

It is an embodiment of the present invention to provide a support for a pipeline inspection apparatus for inspecting the condition of a pipeline when deployed into a liquid containing pipeline, the pipeline inspection apparatus, the support comprising: a plurality of adjustable-length spacers configured to be circumferentially secured around a body of a pipeline inspection apparatus, each spacer comprising a first member pivotally secured to the pipeline inspection apparatus to allow the spacer to move between an extended position away from the body and a collapsed position close to the body; and a second member moveably secured to the first member; wherein when the plurality of adjustable spacers are secured to the pipeline inspection apparatus, the second member is configured to contact the wall of the pipeline to substantially maintain the body of the pipeline inspection apparatus to within about 1% to about 3% of the diameter of the pipeline, or preferably at about 1.5% of the diameter of the pipeline.

It is an embodiment of the present invention to provide an ultrasonic module for use in a pipeline inspection apparatus, the module comprising:
 a plurality of ultrasonic transducers configured to assess the condition of a pipeline; and
 an elongate body including a front end and a rear end opposed to the front end, the body configured to mount the plurality of the ultrasonic transducers around the circumference of the elongate body along a plurality of transverse planes perpendicular to the longitudinal axis of the elongate body aligned wherein the plurality of ultrasonic transducers aligned along one transverse plane are rotationally offset from the ultrasonic transducers aligned along an adjacent transverse plane.

In one aspect, the ultrasonic transducers are rotationally offset from the ultrasonic transducers in the adjacent transverse plane to increase density of mounted ultrasonic transducers. In one aspect, the ultrasonic transducers are rotationally offset from the ultrasonic transducers in the adjacent transverse plane from about 2.5 degrees to about 5 degrees, or preferably about 3.75 degrees.

In one aspect, the adjacent transverse planes are separated to reduce signal overlap; and/or reduce cross talk between ultrasonic sensors. In one aspect, the adjacent transverse planes are separated by about 0.5" to 1.5", or preferably about 1" or 1.1".

In one aspect, the ultrasonic transducers are removeably mounted to the elongate body.

In one aspect, the wall of the elongate body defines a plurality of apertures, each one aperture dimensioned to receive one ultrasonic transducer therethrough.

In one aspect, the ultrasonic module further comprises one or more seals between the wall of the elongate body and the ultrasonic transducer. In one aspect, each one of the one or more seals are seated within a groove defined in the outside surface of the wall. In one aspect, the one or more seals are seated within the aperture. In one aspect, there are two seals seated within the aperture.

In one aspect, the ultrasonic transducers are threadably mounted to the elongate body via mutually cooperating threads on the wall and the ultrasonic transducers.

In one aspect, the ultrasonic transducer contacts the outside surface of the wall via a grooved surface formed on the ultrasonic transducer or a grooved surface the outside surface of the wall, or preferably the grooved surface is formed on the outside surface of the wall.

In one aspect, the ultrasonic module further comprises a retainer comprising a hollow cylinder configured to enclose and protect from impacts. In one aspect, the retainer is dimensioned to substantially enclose the ultrasonic transducer.

In one aspect, each transverse plane includes 10 to 20 ultrasonic transducers, or preferably 16 ultrasonic transducers; and/or there are 4 to 8 transverse planes, or preferably 6 transverse planes. In one aspect, the ultrasonic module has an outer diameter of about 7.5" to 8.5", or preferably about 8" or about 8.25". In one aspect, the ultrasonic module has a length of 14" to 17", or preferably about 15" or 16".

In one aspect, the ultrasonic module further comprises a guard having a forward portion, a rear portion, and a main portion between the forward and rear portions, the main portion defining a plurality of transducer apertures dimensioned to receive the plurality of transducers therethrough to shield the plurality of ultrasonic transducers from impact. In one aspect, the guard further comprises air bleed holes between the one or more of the forward portion, the rear portion, and the main portion to reduce air from being trapped when the ultrasonic module is immersed in liquid. In one aspect, the forward and rear portions have a tapered profile.

In one aspect, the plurality of ultrasonic transducers are mounted closer to the rear end than the front end.

In one aspect, the ultrasonic module further comprises one or more access ports configured to allow access to the interior of the elongate body. In one aspect, the one or more access ports is a solid state drive access port.

In one aspect, the one or more of the forward portion, the rear portion, and the main portion comprise thermoplastics, or preferably HDPE and/or acetal.

It is an embodiment of the present invention to provide a pipeline inspection apparatus for inspecting the condition of a pipeline when deployed into a pipeline containing a liquid, the apparatus comprising:
 an ultrasonic module; and
 a plurality of circumferentially spaced wall spacers configured to contact the wall of the pipeline.

In one aspect, the ultrasonic module comprises a plurality of ultrasonic transducers configured to assess the condition of a pipeline and an elongate body including a front end and a rear end opposed to the front end, the body configured to mount the plurality of the ultrasonic transducers around the circumference of the elongate body along a plurality of transverse planes perpendicular to the longitudinal axis of the elongate body aligned wherein the plurality of ultrasonic transducers aligned along one transverse plane are rotationally offset from the ultrasonic transducers aligned along an adjacent transverse plane.

In one aspect, the apparatus further comprises a spacer base secured to each one of the front end and the rear end of the elongate body, the spacer base is configured to pivotally secure the plurality of circumferentially spaced wall spacers to the elongate body. In one aspect, the spacer base is configured to permit the plurality of circumferentially spaced wall spacers to pivotally move between an extended position away from the elongate body and a collapsed position close to the elongate body. In one aspect, the spacer base is configured to bias the plurality of circumferentially spaced wall spacers into the extended position. In one aspect, the spacer base comprises a stopper to restrict movement of the plurality of circumferentially spaced wall spacers beyond the extended position. In one aspect, the spacer base comprises an oversprung spring configured to generate a pre-load force sufficient move the plurality of circumferentially spaced wall spacers beyond the extended position in the absence of the stopper. In one aspect, the extended position is about 75 degrees from the longitudinal axis of the elongate body.

In one aspect, the plurality of circumferentially spaced wall spacers substantially maintain the apparatus to within about 1% to about 3% of the diameter of the pipeline, or preferably at about 1.5% of the diameter of the pipeline. In one aspect, the plurality of circumferentially spaced wall spacers are buoyant. In one aspect, the length of each one of one of plurality of circumferentially spaced wall spacers is adjustable.

It is an embodiment of the present invention to provide a support for a pipeline inspection apparatus for inspecting the condition of a pipeline when deployed into a liquid containing pipeline, the pipeline inspection apparatus including an ultrasonic module comprising a plurality of ultrasonic transducers, the support comprising:

a plurality of adjustable-length spacers configured to be circumferentially secured around a body of a pipeline inspection apparatus, each spacer comprising a first member pivotally secured to the pipeline inspection apparatus to allow the spacer to move between an extended position away from the body and a collapsed position close to the body; and a second member moveably secured to the first member;

wherein when the plurality of adjustable spacers are secured to the pipeline inspection apparatus, the second member is configured to contact the wall of the pipeline to substantially maintain the body of the pipeline inspection apparatus to within about 1% to about 3% of the diameter of the pipeline, or preferably at about 1.5% of the diameter of the pipeline.

In one aspect, the inspection device further comprises a spacer base secured each one of the front end and the rear end of the ultrasonic module, the spacer base is configured to pivotally secure the plurality of circumferentially spaced wall spacers to the ultrasonic module. In one aspect, the spacer base is configured to permit the plurality of spacers to pivotally move between an extended position away from the ultrasonic module and a collapsed position close to the ultrasonic module. In one aspect, the spacer base is configured to bias the plurality of spacers into the extended position. In one aspect, a stopper restricts movement of the plurality of spacers beyond the extended position. In one aspect, the spacer base comprises an oversprung spring configured to generate a pre-load force sufficient move the plurality of spacers beyond the extended position in the absence of the stopper. In one aspect, the extended position is about 75 degrees from the longitudinal axis of the elongate body.

In one aspect, the first member and the second member are configured for slidable lengthwise movement. In one aspect, the first member and the second member include mutually cooperating structures that permit the slideable lengthwise movement. In one aspect, the mutually cooperating structures comprise a key and an elongated keyway dimensioned for receiving the key therein.

It is an embodiment of the present invention to provide a pipeline inspection apparatus for inspecting the condition of a pipeline when deployed into a pipeline containing a liquid, the apparatus comprising:

an ultrasonic module comprising a plurality of ultrasonic transducers configured to assess the condition of a pipeline; and a plurality of wall spacers circumferentially emplaced around the ultrasonic module, the wall spacers configured to moveably contact the wall of the pipeline and maintain the ultrasonic module to within about 1% to about 3% of the diameter of the pipeline, or preferably at about 1.5% of the diameter of the pipeline.

In one aspect, the ultrasonic module comprises:

an elongate body including a front end and a rear end opposed to the front end, the body configured to mount the plurality of ultrasonic transducers around the circumference of the elongate body aligned along adjacent transverse planes wherein the plurality of ultrasonic transducers aligned along one transverse plane are rotationally offset from the plurality of ultrasonic transducers aligned along an adjacent transverse plane.

In one aspect, the plurality of circumferentially spaced wall spacers are pivotally secured to the elongate body to permit the plurality of circumferentially spaced wall spacers to pivotally move between an extended position away from the elongate body and a collapsed position close to the elongate body.

In one aspect, plurality of circumferentially spaced wall spacers are biased into the extended position.

DETAILED DESCRIPTION

Figure 1:
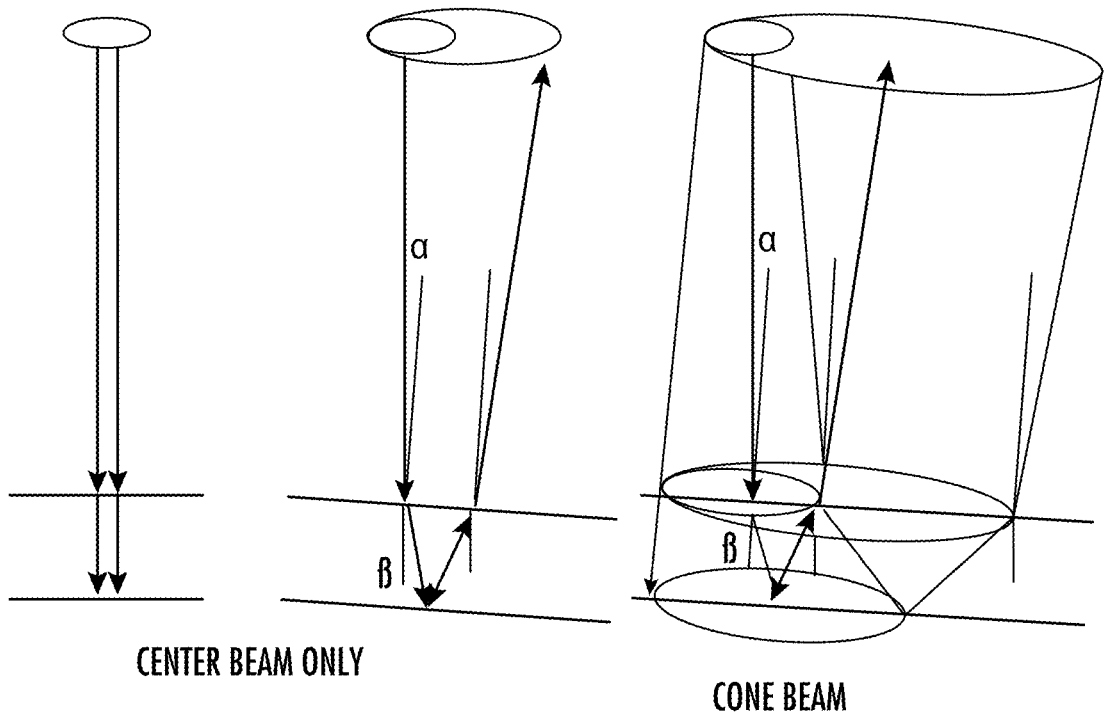
FIG. 1 is a schematic showing the effects of changes in the direction of the ultrasonic transducer on the signals for assessing the condition of a wall of a pipeline.
Figure 2:
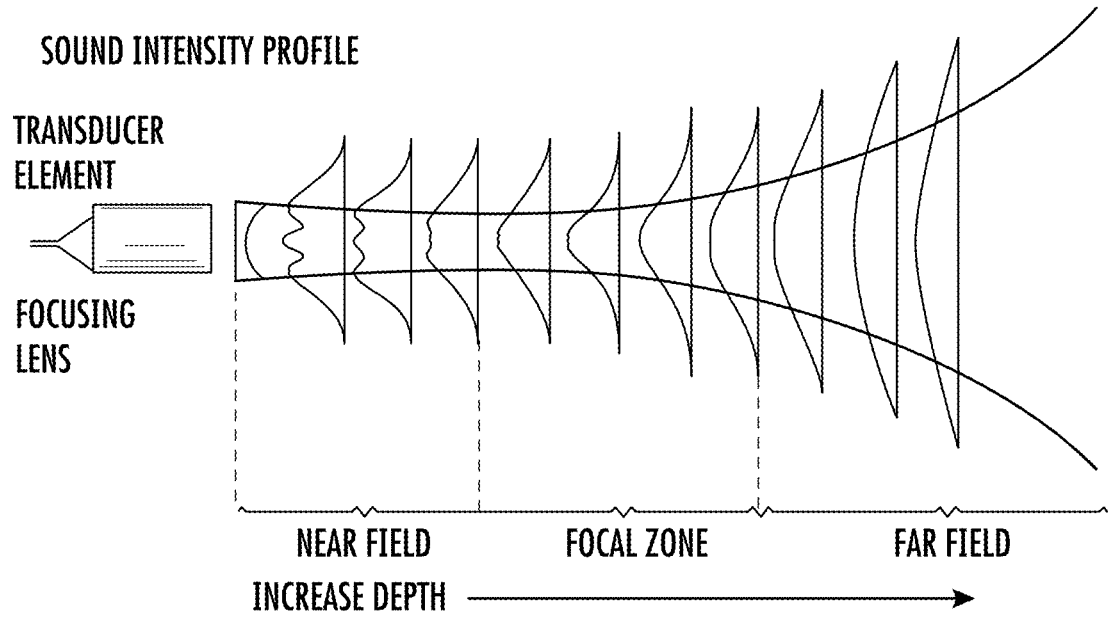
FIG. 2 is a schematic showing the effects of changes of the sound intensity profile with varying distance from the transducer element.
Figure 3:
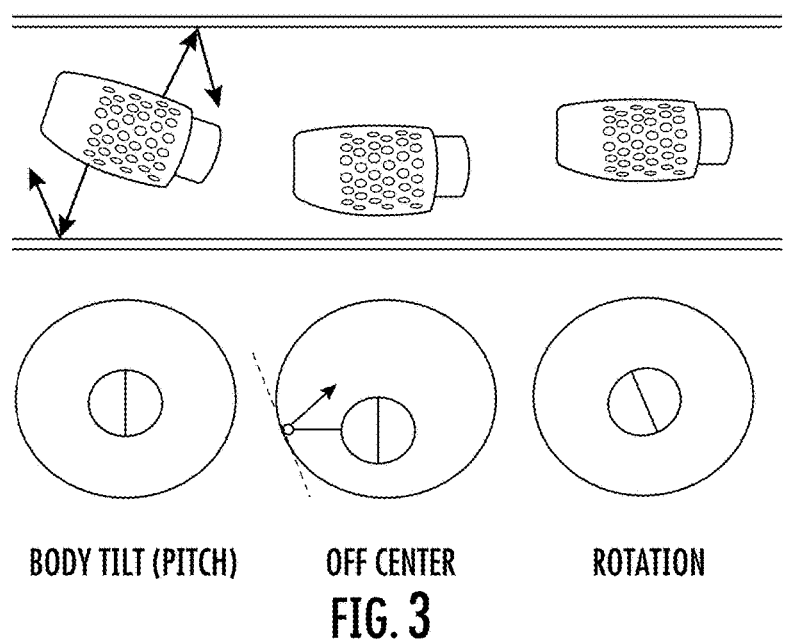
FIG. 3 is a schematic showing variations in orientation of the transducer from tilt, off centering, and rotation.
Figure 4:
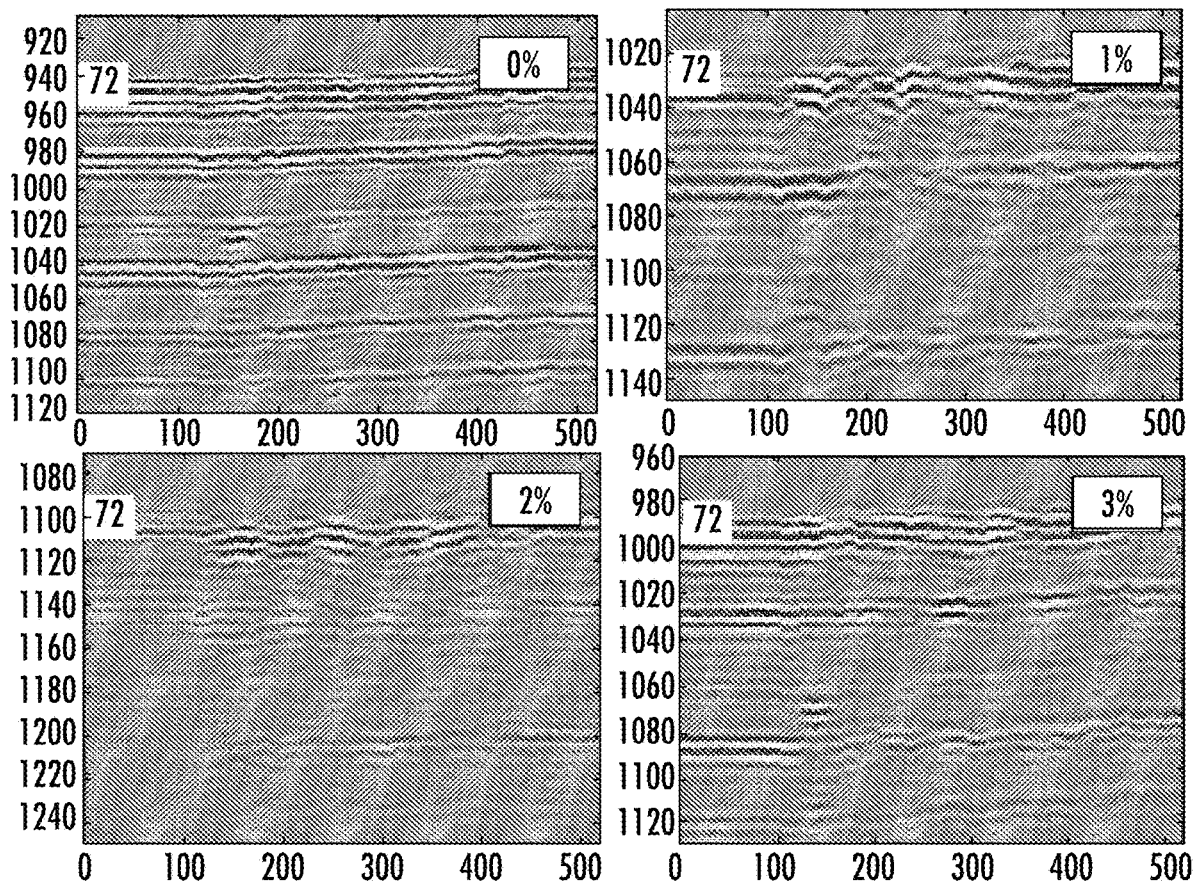
FIG. 4 shows graphs depicting the effects of the off centering of the transducer module relative to the center axis of the pipe.
Figure 5:
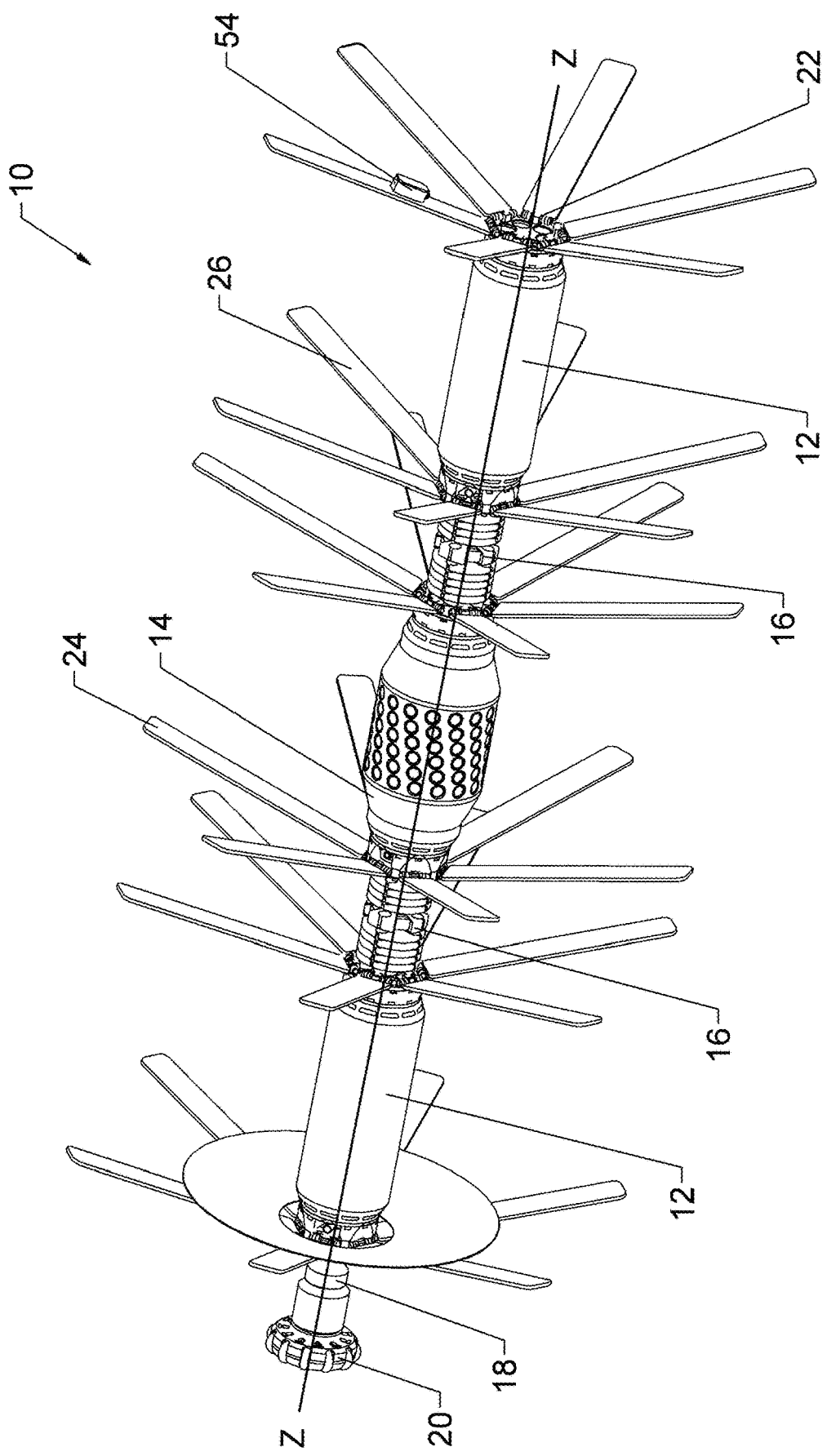
FIG. 5 shows a perspective view of an embodiment of a pipeline inspection device including an ultrasonic transducer module, batteries, tow links connecting the module with the batteries, support petals secured at ends of the module and batteries, a roller nose at the front, and a pinger at the rear of the device.
Figure 6:
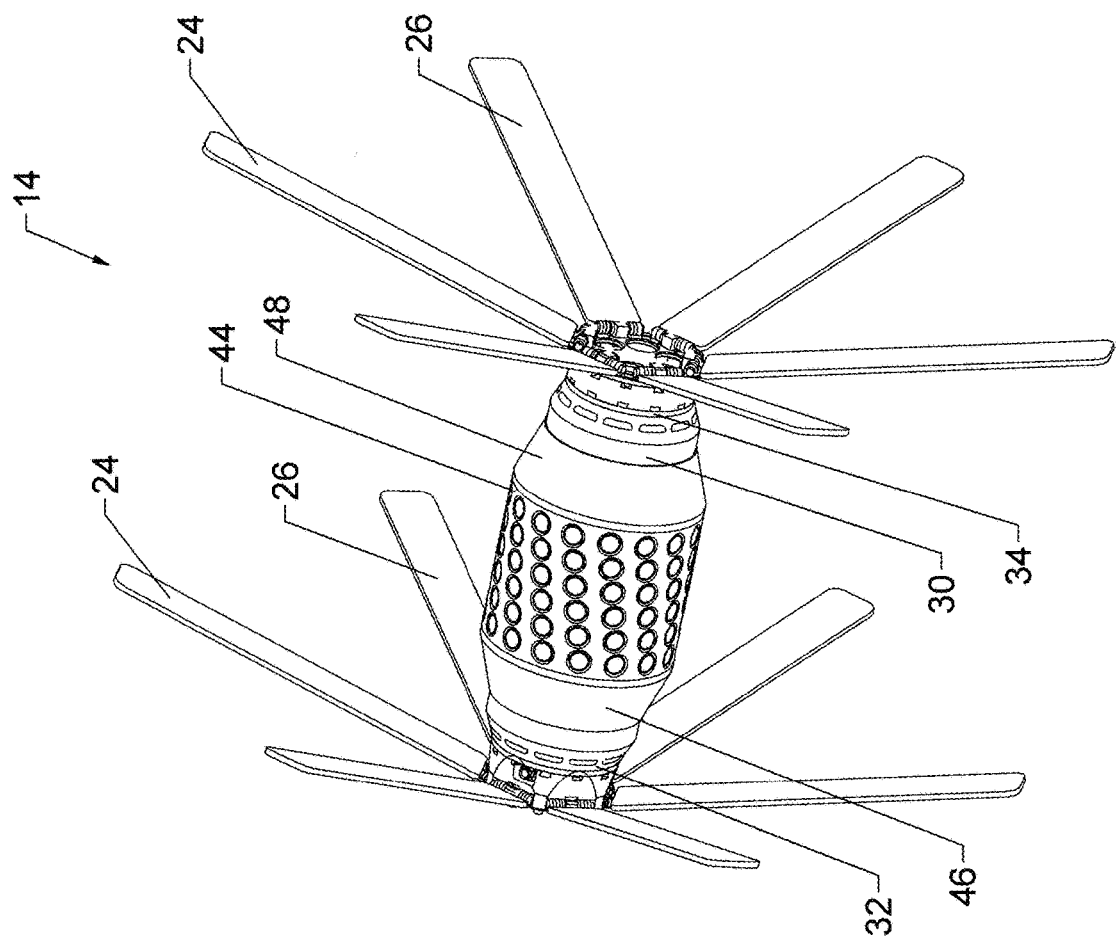
FIG. 6 shows a perspective view of the ultrasonic module with an arrangement of 36" support petals secured at each of the front and the rear of the module in FIG. 5.

Reference will be made below in detail to exemplary embodiments of the invention, examples of which are illustrated in the accompanying drawings. Wherever possible, the same reference numerals used throughout the drawings refer to the same or like parts.

With reference to the FIGS. 5 to 9 there is provided, according to one embodiment, an apparatus 10 for assessing metallic pipeline wall condition. The apparatus 10 of the present disclosure is the first application of using ultrasonic transducers mounted on a free-swimming collapsible platform for inline inspection of metallic pipelines 2. The apparatus 10 provides valuable wall condition details along the pipe length such as liner thickness and areas of delamination, metal wall thickness and locations of detailed corrosion, pipe out of roundness, and identification of air pockets.

The apparatus 10 consists of one or more pressure rated battery modules 12 and an ultrasonic module 14 connected using flexible urethane tow links 16. The modular design of the apparatus 10 allows for various configurations as well as additional battery modules 12 for increased runtimes to cover longer inspection distances.

A front 18 of the apparatus 10 includes a flexible urethane roller nose 20 is provided in for navigating inline features such as valves and bends and a rear 22 which can include a tether (not shown) to a location of the launch (not shown).

The apparatus 10 is free-swimming when deployed into the liquid containing pipeline. Support 24 comprises twelve (12) petal-like spacers 26 circumferentially mounted about the longitudinal axis (z) of the apparatus 10 and as will be described in further detail below, the spacer 26 is configured to contact the pipeline wall when in an extended position to keep the longitudinal axis of the apparatus 10 aligned within the about the center of the pipeline. Each spacer 26 is pivotally connected to the ends of the battery modules 12 and/or the ultrasonic modules 14 to enable pivotal movement from an extended wall contacting position to a collapsed position close to the traversing butterfly and plug valves where existing full diameter tools would have issues traversing to an extended position.

Ultrasonic module 14 comprises a plurality of ultrasonic transducers 28, a body 30 that includes a first end 32 and second end 34 opposed to the first end 32 and a wall 36 connecting the first end 32 to the second end 34. A plurality of apertures 38 are defined by the wall 36 and are dimensioned to receive and threadably mount the ultrasonic transducers 28 therethrough using a wrench 39. One or more o-ring seals 40 seated in a groove 42 formed on the outer surface of the wall 36, where seals 40 are provided to dampen the vibration between the transducer 28 and the body 30.

Ultrasonic transducers 28 can be, for example, a piezo ceramic type or can be any type of ultrasonic transducer suitable for assessing the condition of the pipeline. Transducers 28 are densely distributed to increase sensing resolution and to maintain a center of gravity on the module axis and are arranged to provide an equal transducer coverage of the pipe wall.

In one embodiment, the mounting pattern of the ultrasonic transducers 28 is in the form of a plurality of transducers arranged in adjacent planes transverse to the longitudinal axis of the module 14. Individual transducers 28 are mounted circumferentially about the body 30 of the module 14 and along each of the planes and facing the wall of the pipeline 2. Each adjacent plane of transducers is shifted so that there is a rotational offset of one plane with respect to adjacent planes. Adjacent planes are also separated by a distance. The rotational offset and the separation distance is configured to reduce the signal overlap and/or reduces cross talk between the transducers to reduce signal interference.

Figure 7:
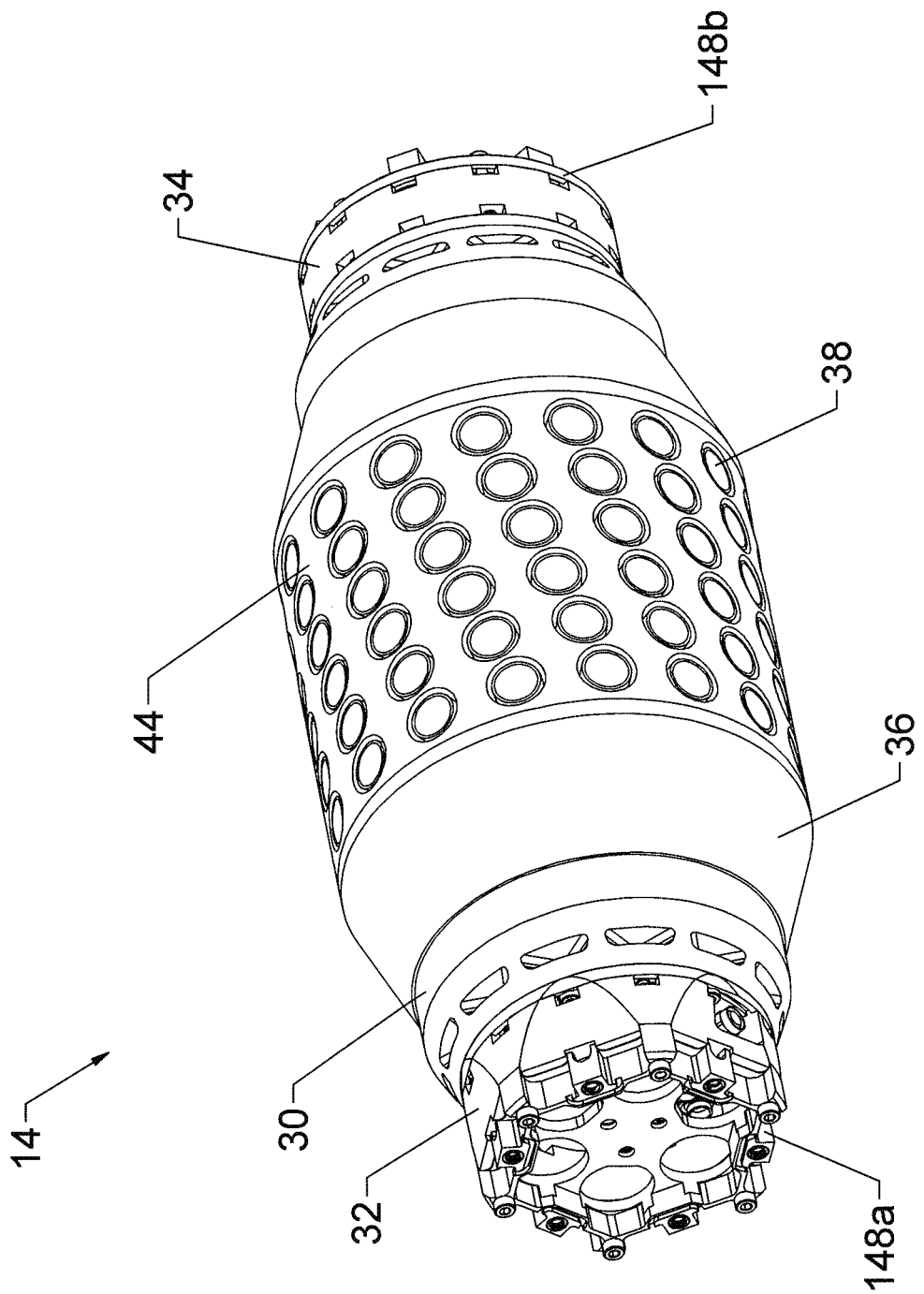
FIG. 7 shows an enlarged perspective view of the ultrasonic module of FIG. 6 with the support petals removed.
Figure 8:
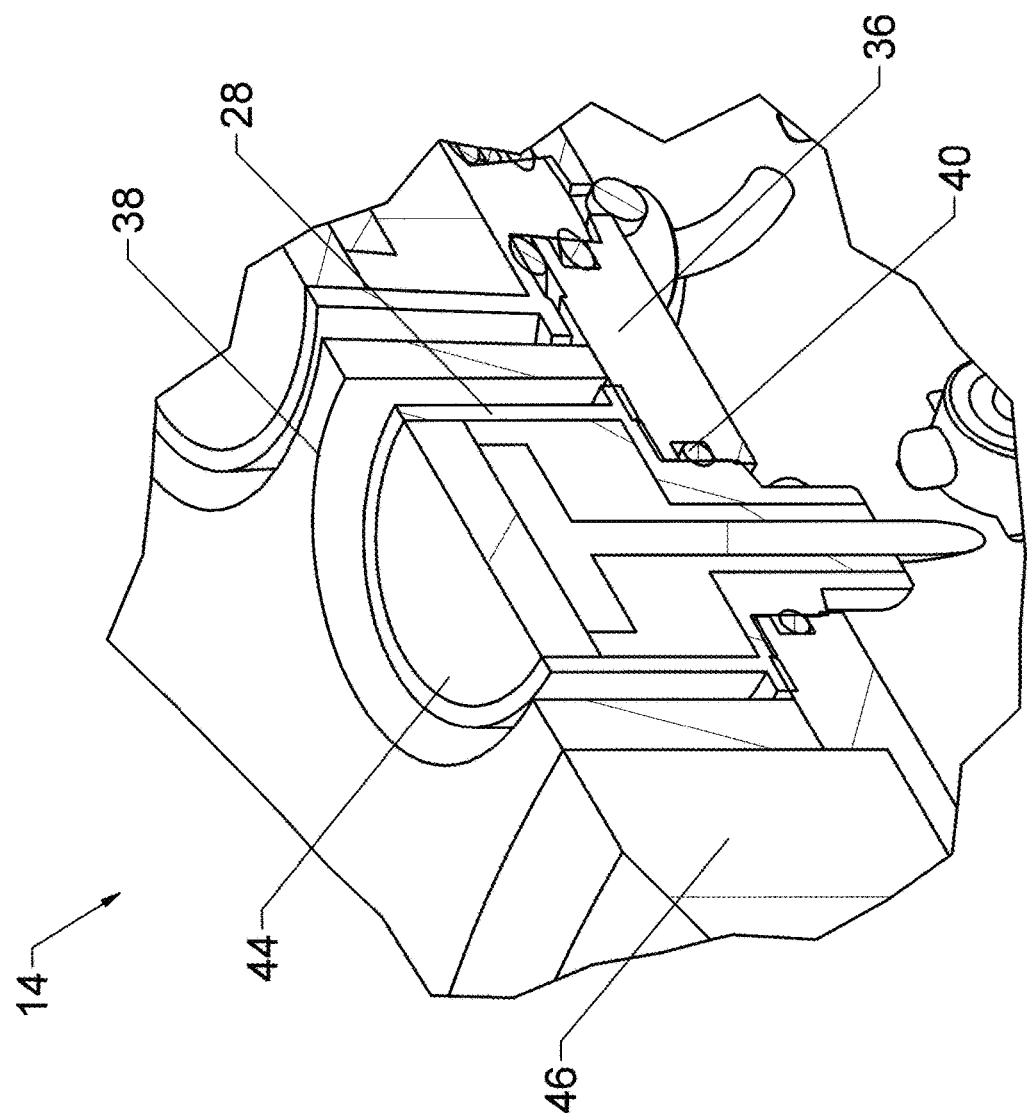
FIG. 8 shows a partial cross section view along the line 8-8 in FIG. 7.
Figure 9:
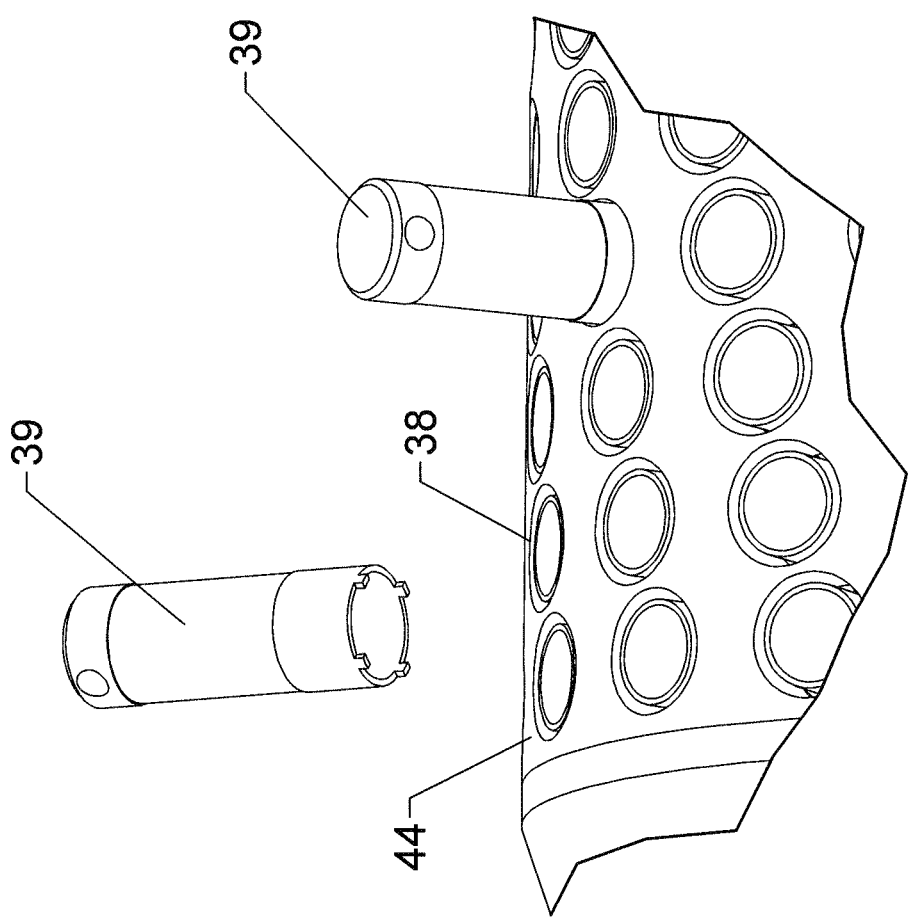
FIG. 9 shows a transducer wrench for inserting an ultrasonic transducer of the ultrasonic module of FIGS. 5 to 8.
Figure 10:
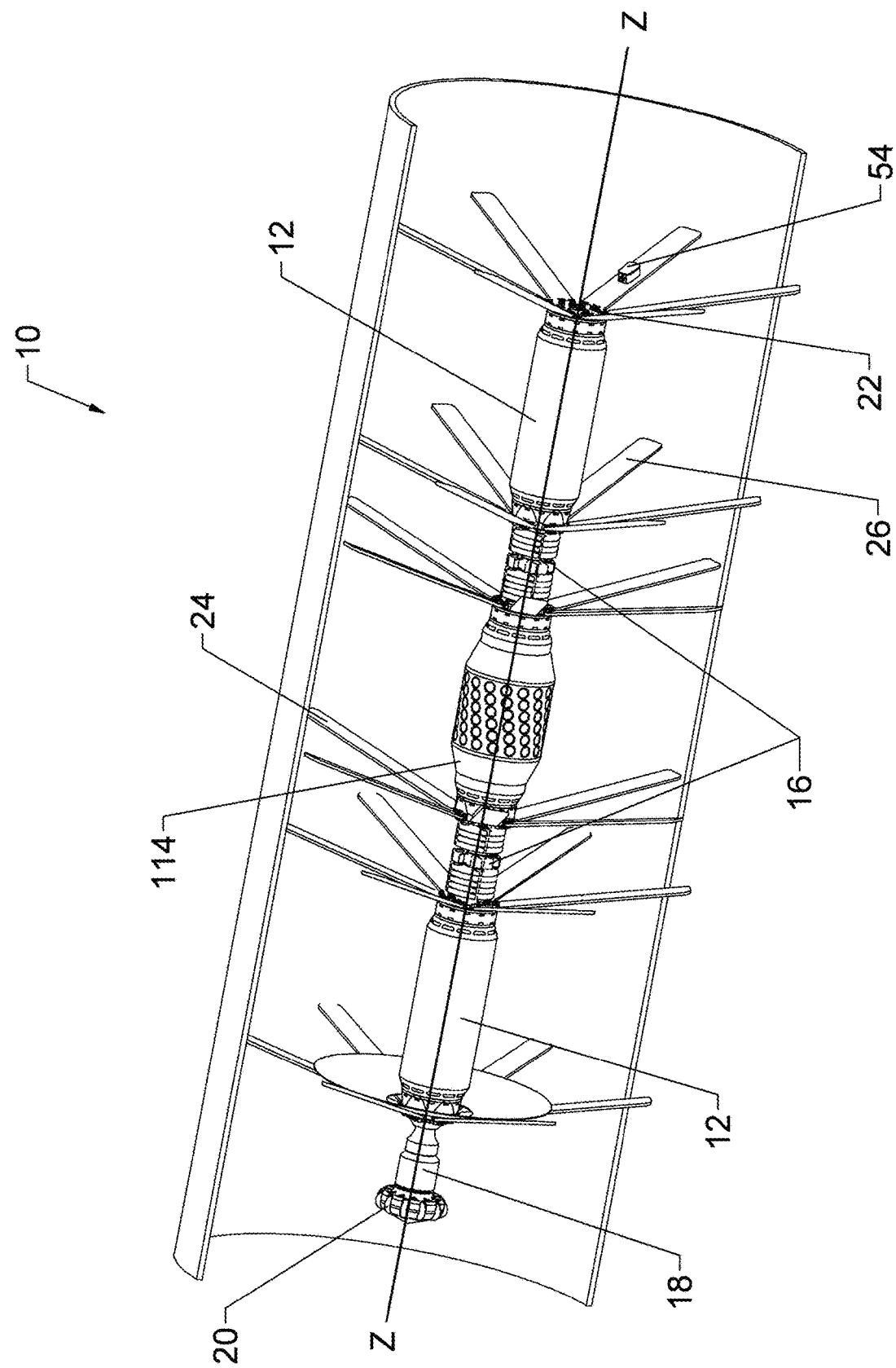
FIG. 10 shows a perspective view of an embodiment of another pipeline inspection device including an ultrasonic transducer module, batteries, tow links connecting the module with the batteries, support petals secured at ends of the module and batteries, a roller nose at the front, and a pinger at the rear of the device.
Figure 11:
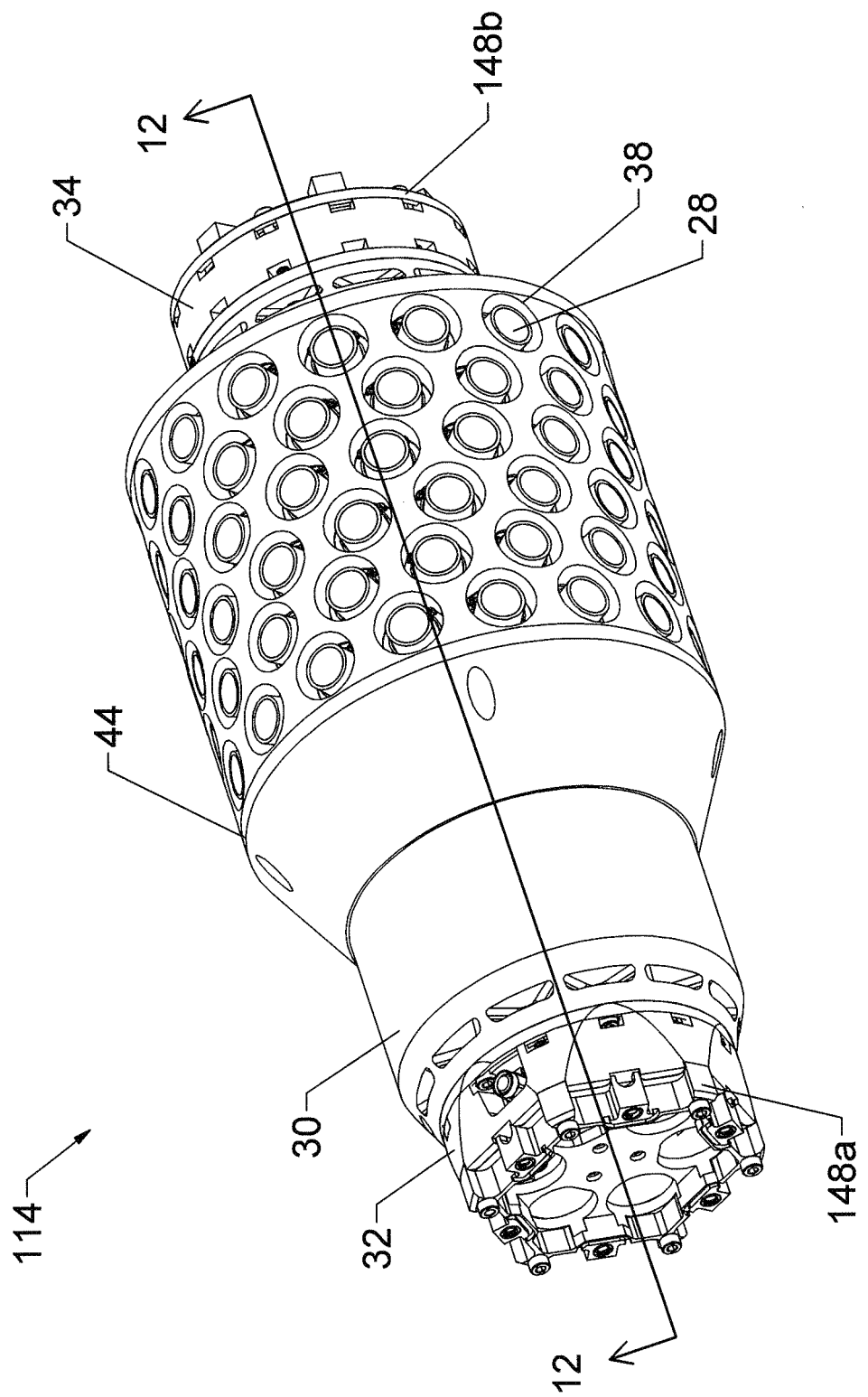
FIG. 11 shows a perspective view of the ultrasonic module of the device in FIG. 10 with the support petals removed.
Figure 12:
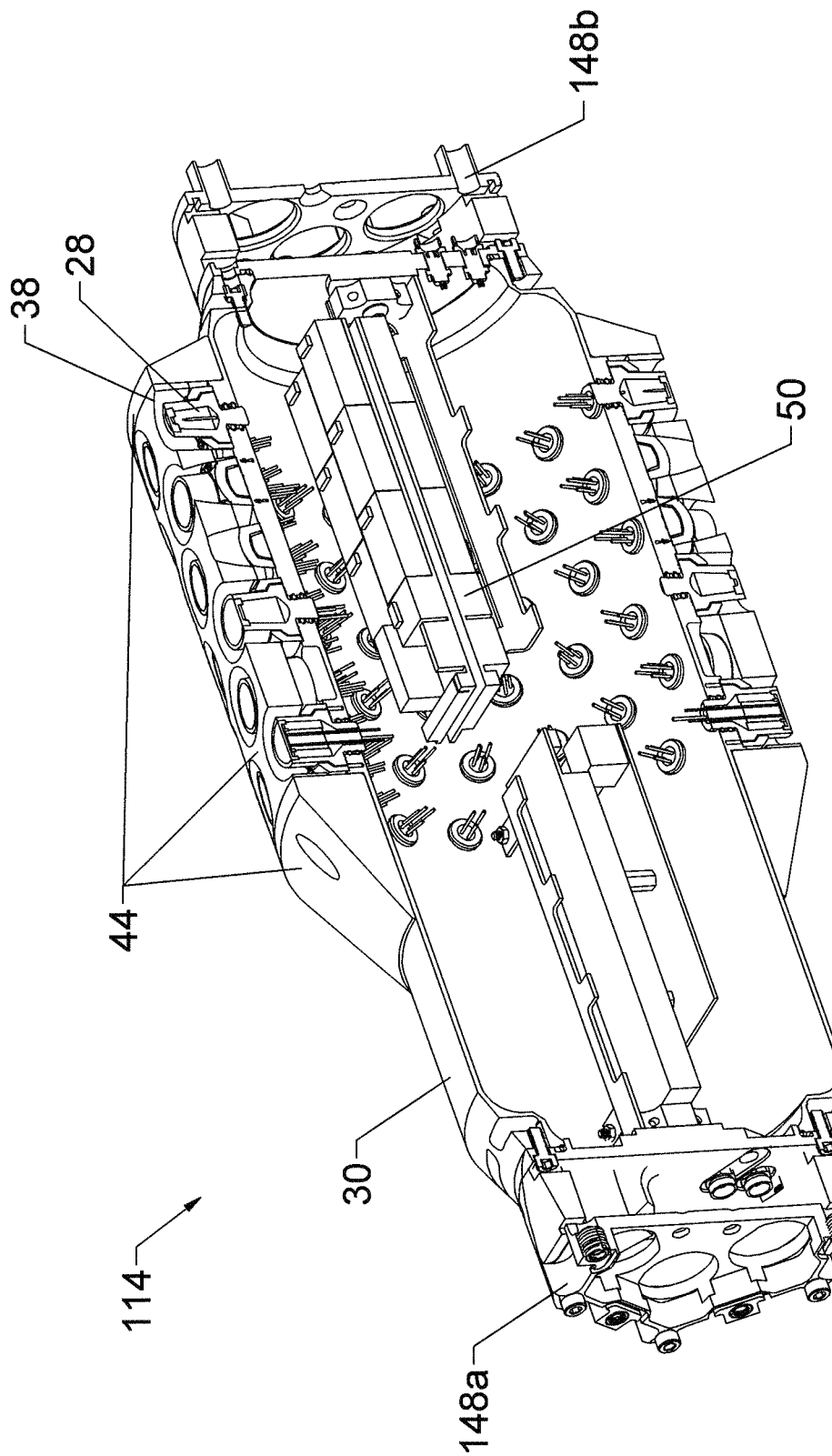
FIG. 12 shows a cross section view along the line 12-12 in FIG. 11.

As shown in FIG. 7, the module 14 includes six (6) transducer planes with sixteen (16) transducers 28 per plane totaling ninety six (96) transducers 28 mounted circumferentially around the body 30 of the module 14. Adjacent transducer planes are separated by about 1" and each plane is shifted about 3.75 degrees relative to an adjacent plane for full uniform coverage of the pipe wall. In some embodiments the rotational offset between adjacent planes can be from about 2.5 degrees to about 5 degrees and the plane separation is can be from about 0.5" to about 1.5", or preferably about 1" or about 1.1".

A guard 44 protects otherwise exposed transducers 28 against impact with pipe features such as valves and bends. The guard 44 has a forward portion 46, main portion 48, and a rear portion 50. To protect the transducers 28 from impact with pipeline features such as valves and bends when travelling downstream or upstream with the flow of liquid.

As shown, the forward portion 46 and the rear portion 50 are configured with different tapering angles where the forward portion 46 can include a smaller taper angle as compared to the rear portion 50 to improve movement of the apparatus 10 in the liquid-filled pipeline. The main portion 48 defines a plurality of transducer apertures 52 dimensioned to receive the transducers 28 therethrough. The guard 44 can be made from any suitable materials which are durable and light, such as for example, HDPE or Acetal.

In one embodiment, the module 14 can have a diameter of about 8" such that when in the collapsed geometry, the apparatus 10 is able to pass 24" butterfly valves. The module 14 can have a length of about 15" to minimize the turning radius to access into and out of the smaller diameter pipes.

The module 14 carries a payload of electronics 50 to drive the transducers 28 and to acquire and store the data, for example, using hard drives 52. A pinger 54 use to provide for location tracking is secured to one of the petals 26 of the support 24.

FIGS. 10 to 14 show another embodiment of module 114. In module 114, the placement of the array ultrasonic transducers 28 is shifted and mounted closer to the rear of the body 30 to provide clearance for the acoustic wave path and minimize interference as the supports (not shown) would be angled rearward once the apparatus 10 is deployed inside the pipeline and set in motion and carried by the movement of the liquid inside the pipeline.

Figure 13:
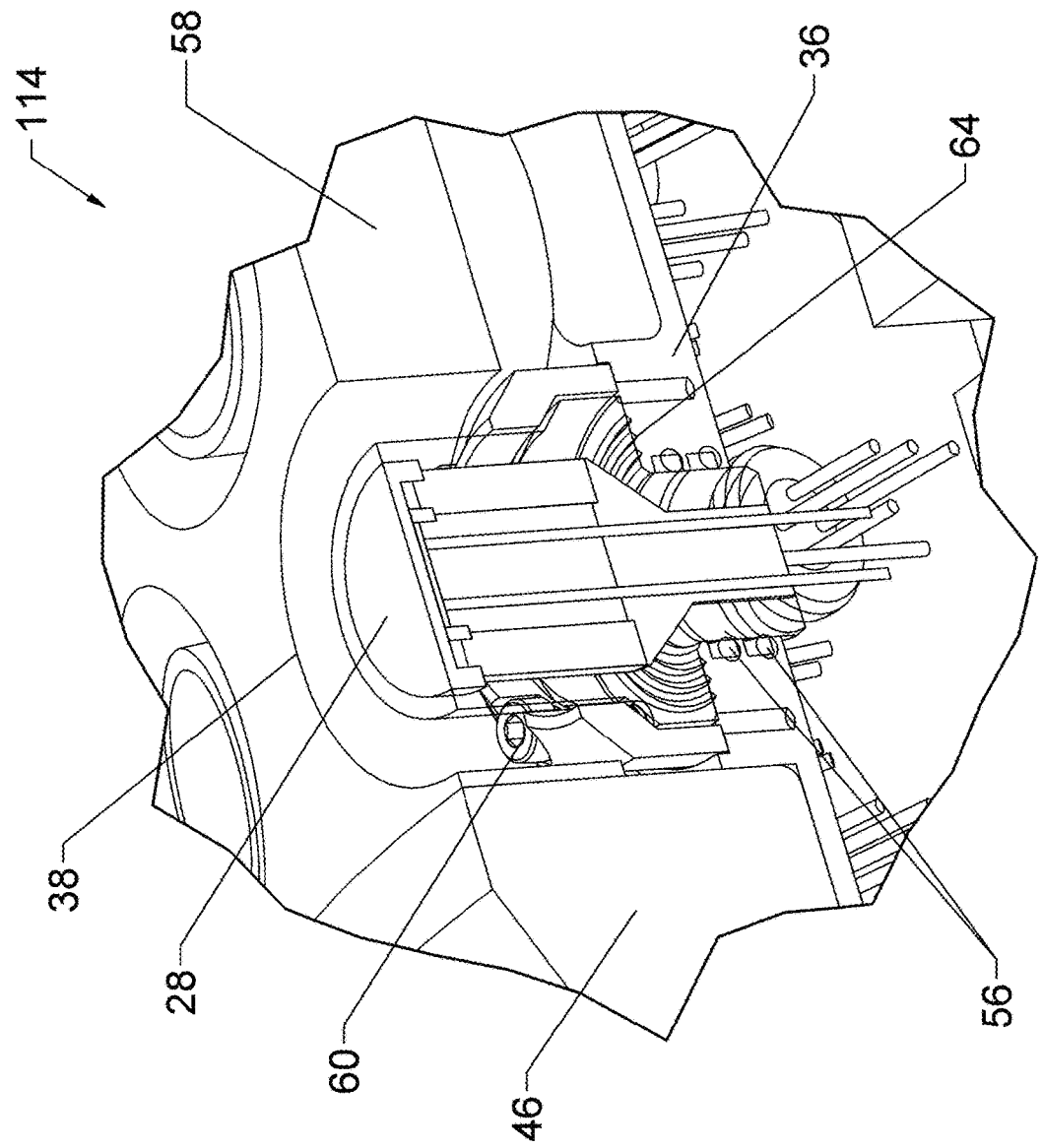
FIG. 13 shows an enlarged partial cross section view along the line 12-12 in FIG. 11 showing an ultrasonic transducer.
Figure 14:
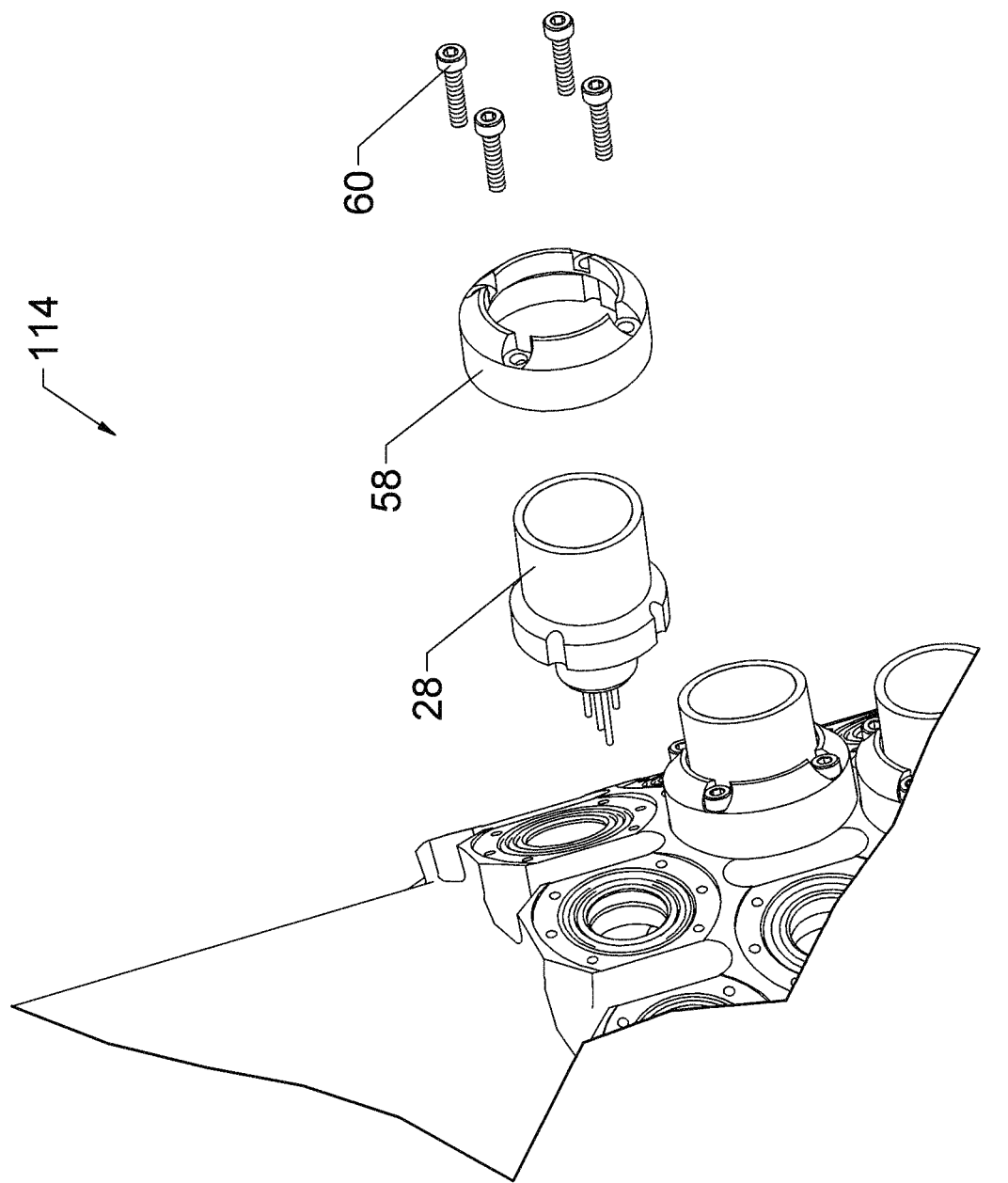
FIG. 14 shows an exploded perspective of the ultrasonic transducer and retainer as shown in FIGS. 10 to 13.

In module 114, transducers 28 are mounted in apertures 38 defined by the wall 36. One or more o-ring seals 56 are seated inside the wall 36 and are axially aligned with the aperture 38. As depicted in FIG. 13, seals 56 can be a double O-ring radial seal design within the wall 36 or can comprises any number of seals 56. The seals also serve as a transducer damper to absorb vibration and eliminate cross talk.

A retainer 58 and screws 60 secure the transducer 28 in place. The retainer 58 is a hollow cylinder that encircles the transducer 28 to protect it from physical impacts. A gap 62 is formed between the sidewall of the retainer 56 and the sidewall of the transducer 28. Once the module 114 is deployed inside the pressurized and liquid-filled pipeline, liquid fills in the gap 62 and there is little or no mechanical contact between the retainer 56 and the transducers 28. A grooved contact surface 64 is formed on the surface of wall 36 and is designed to reduce mechanical contact between the base of each transducer 28 and the wall 36 of the body 30.

FIGS. 15 to 19 show another embodiment of module 214. The guard 44 further comprises air bleed holes 66 to minimize air from being trapped between the guard 44 and the transducers 28 and to improve balancing accuracy.

A retainer 68 in the form of a hollow cylinder that includes a sidewall having a length to sufficiently enclose and protect the transducer 28. Retainer 68 is mounted using screws 70. The body 30 further comprises an access port 72 with a removable cover 74. Access port 66 allows access to various electronic component 50 such as hard drives/solid state drives 52 or a central processing unit (CPU) 73 and a transducer board stack 76 located in the interior of the module 14. Ballasts 78 at either or both ends of the module 14 are provided to maintain balance. Markings 80 are provided to help identify individual transducers 28.

Figure 15:
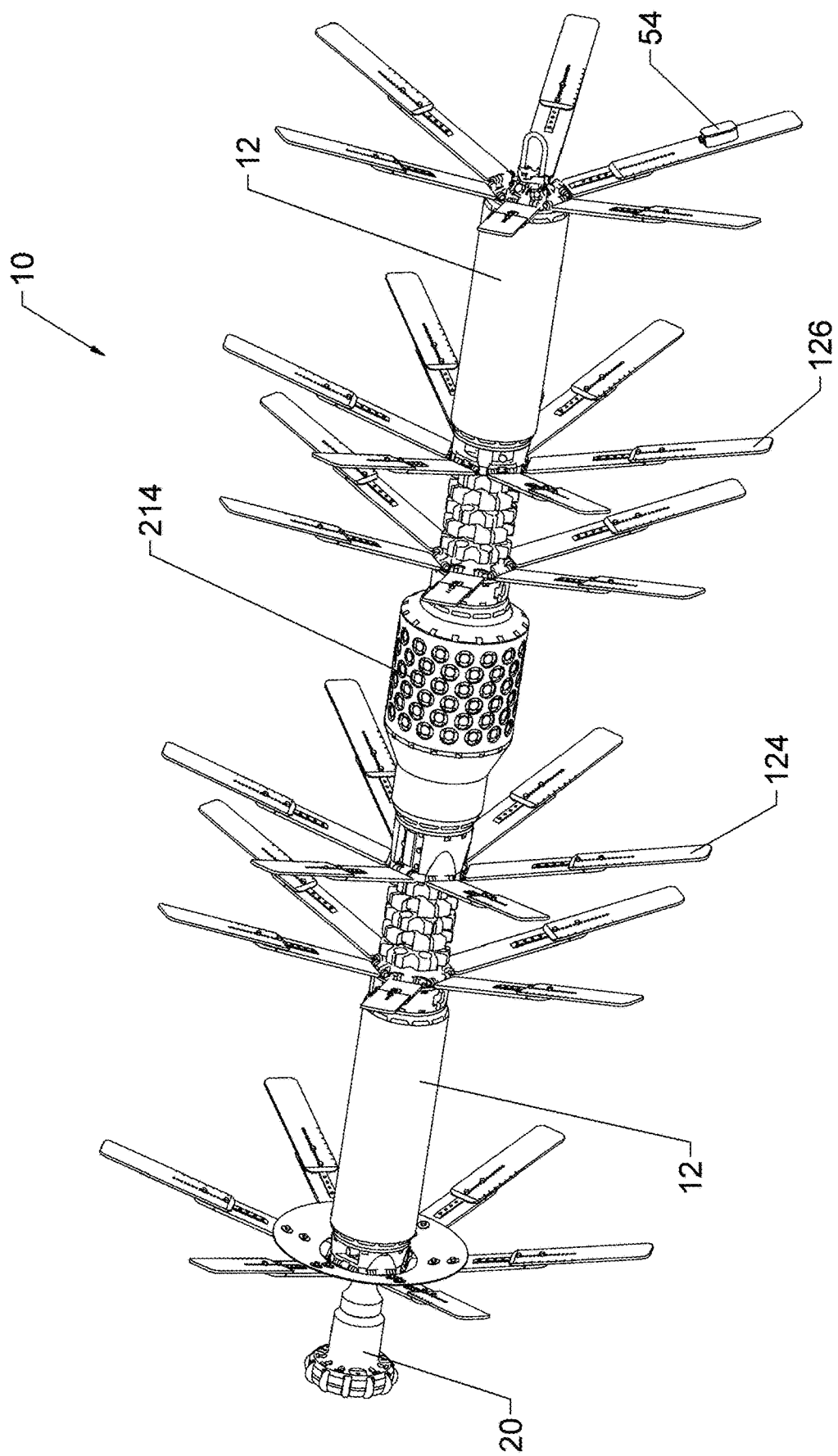
FIG. 15 shows a perspective view of another embodiment of a pipeline inspection device including an ultrasonic transducer module, batteries, tow links connecting the module with the batteries, adjustable support petals secured at ends of the module and batteries, a roller nose at the front, and a pinger at the rear of the device.
Figure 16:
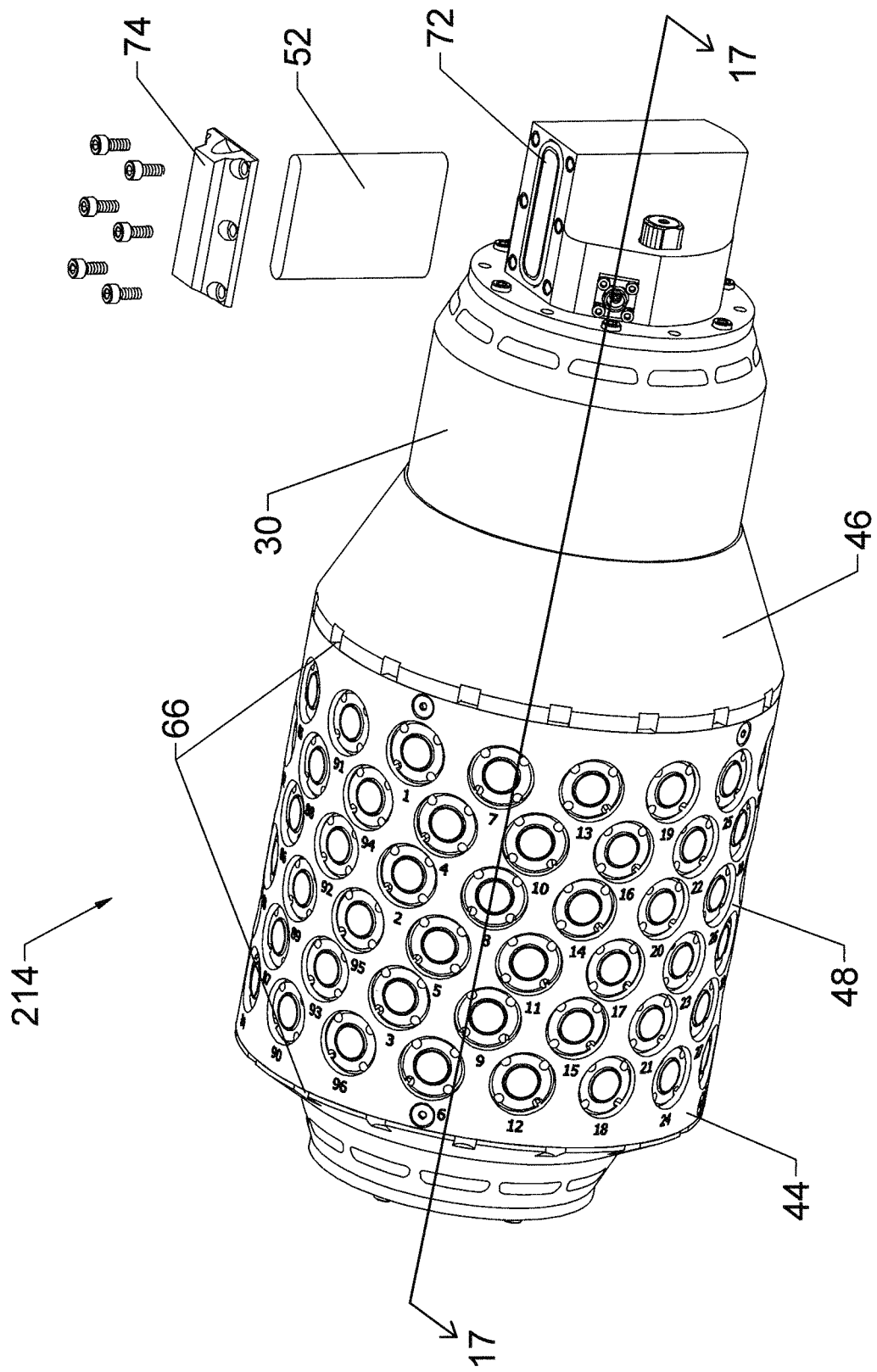
FIG. 16 a perspective view of the ultrasonic module of the device in FIG. 10 with the support petals removed.
Figure 17:
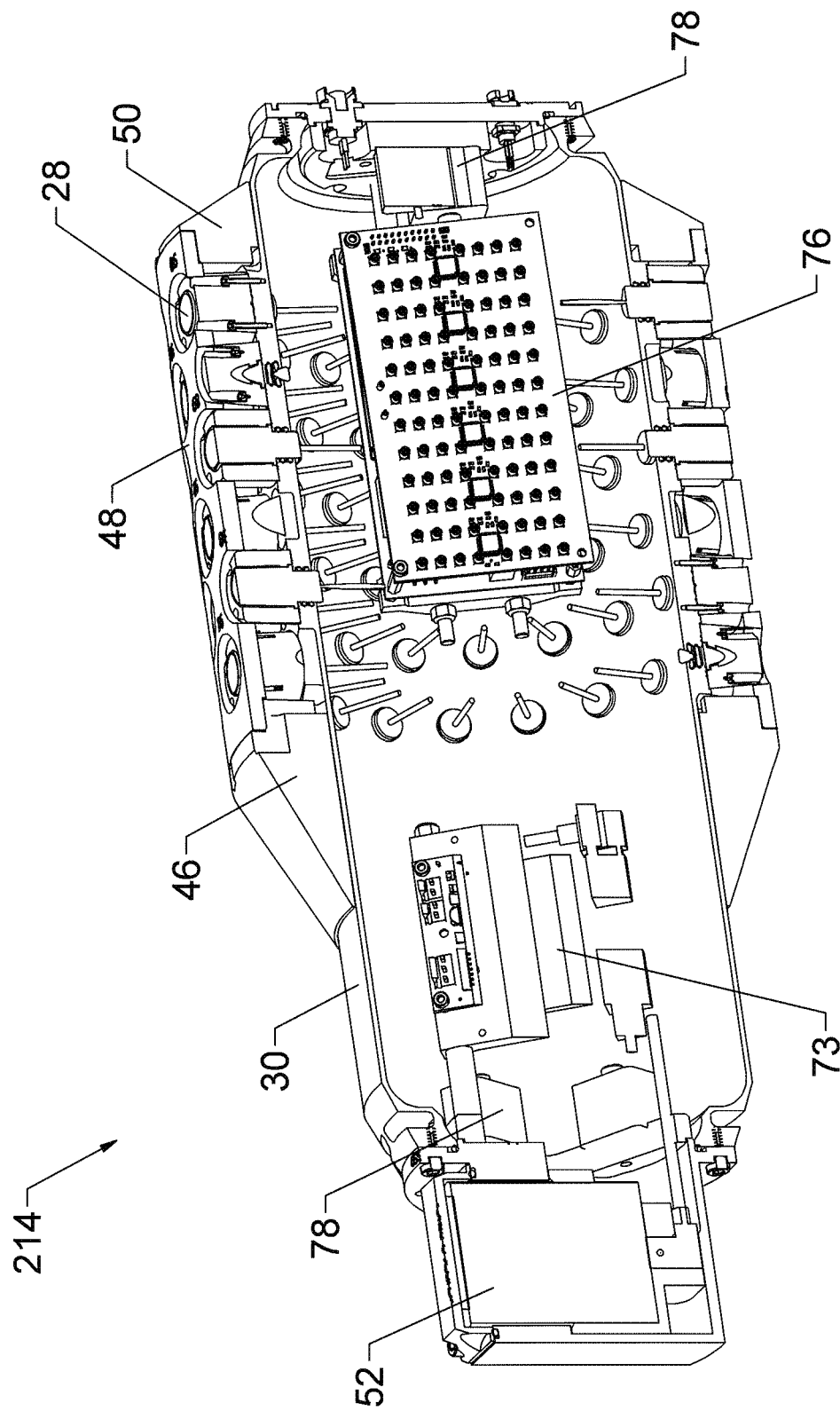
FIG. 17 shows a cross section view along the line 17-17 in FIG. 16.
Figure 18:
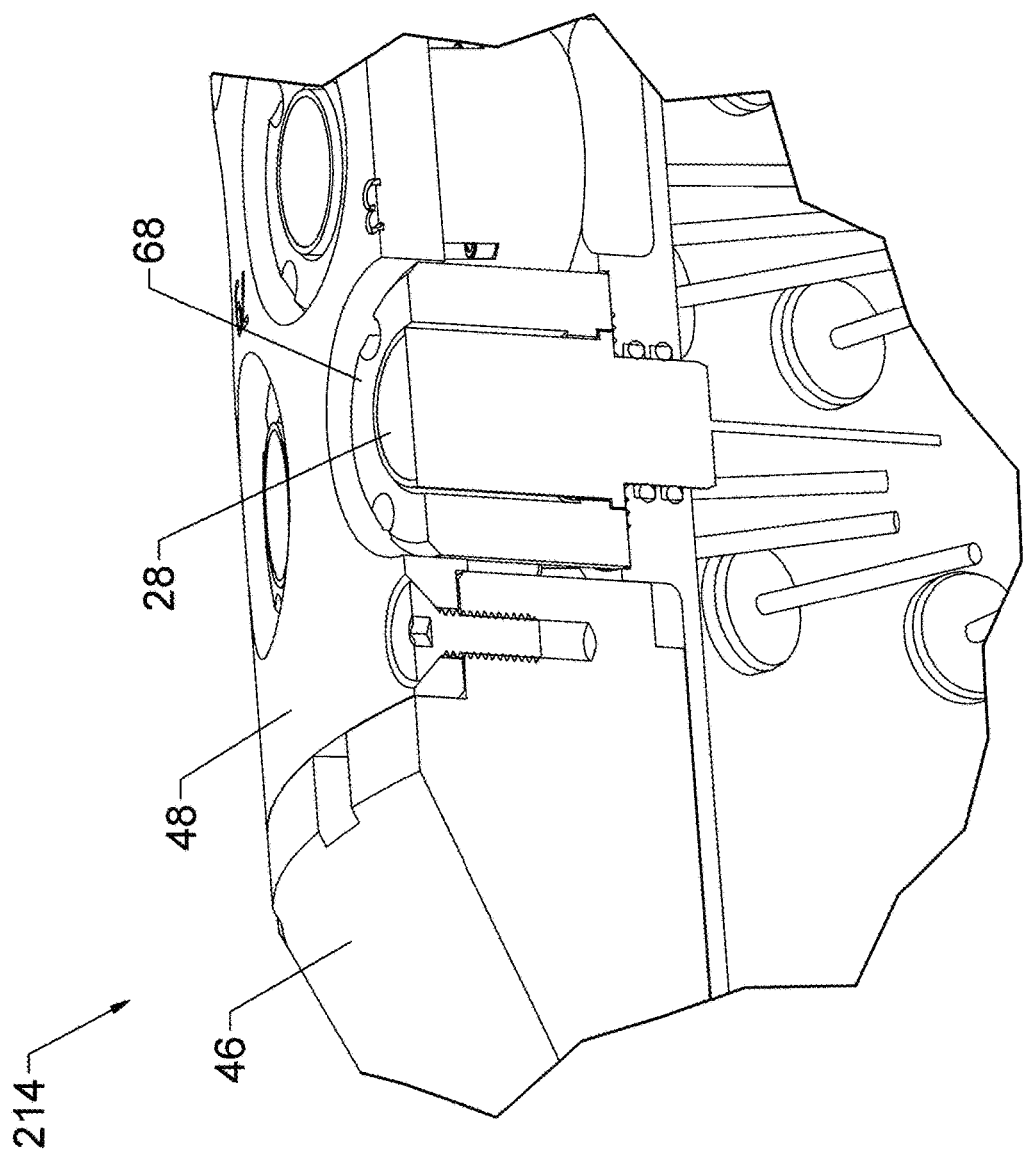
FIG. 18 shows a partial cross section view along the line 17-17 in FIG. 16.
Figure 19:
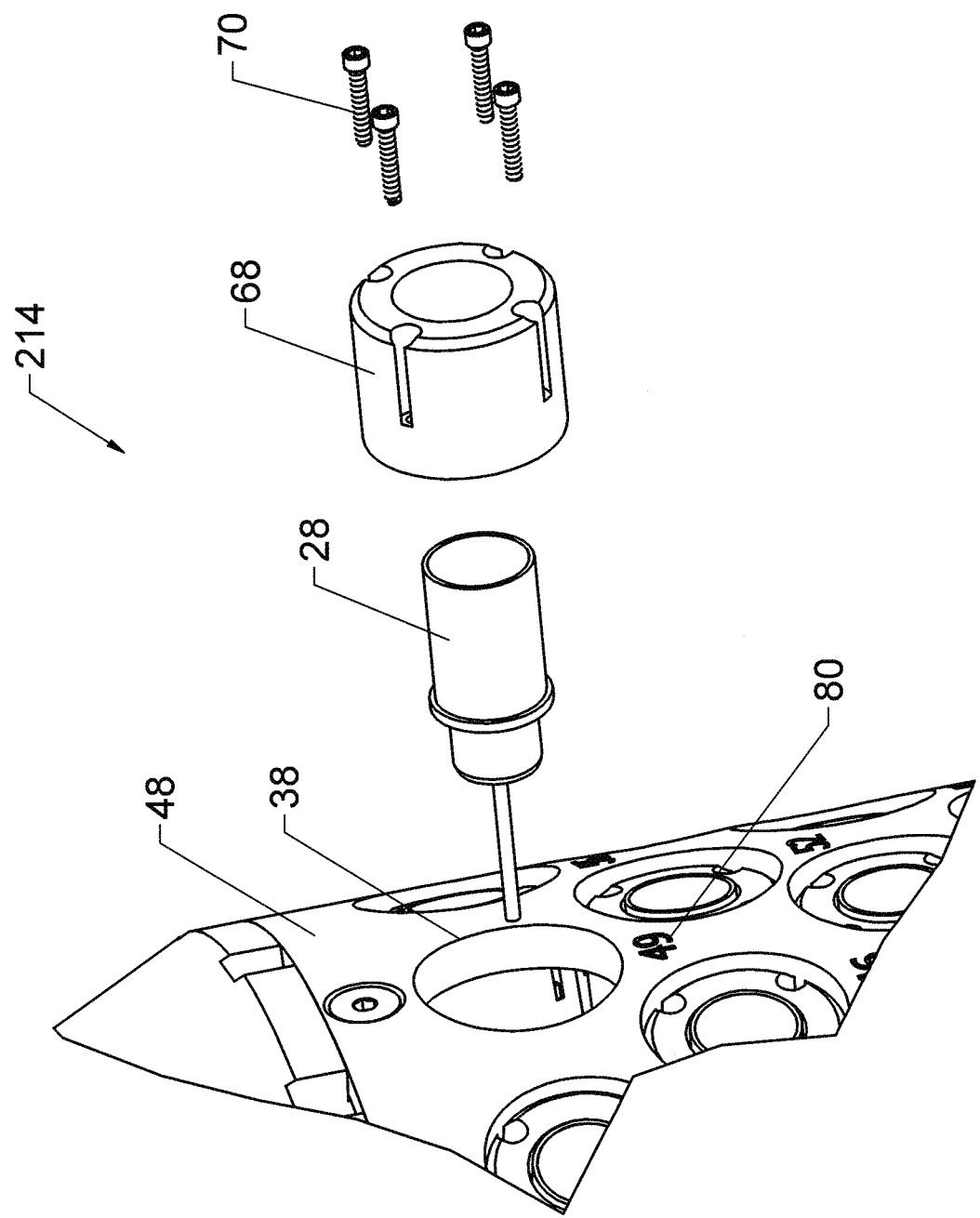
FIG. 19 shows an exploded perspective of the ultrasonic transducer and retainer as shown in FIGS. 15 to 18.

FIG. 15 shows a plurality of adjustable pre-loaded supports 124 secured to the apparatus 10 to maintain the alignment of the apparatus 10 with the central longitudinal axis of the pipeline so that the ultrasonic transducers 28 are able to acquire an optimal signal when the apparatus 10 is moved from one point to another point downstream in the pipeline. As will be described below, each of the adjustable pre-loaded supports 124 can be customized to have any appropriate length such that the same apparatus 10 and supports 124 can be transported another location and then used with different diameter pipelines. As shown in FIGS. 20 to 25, each adjustable pre-loaded support 124 comprises a plurality of independently moveable spacers 126 which when mounted in a petal-like arrangement circumferentially about the apparatus 10 are configured to contact the wall of the pipeline. Independently moveable means that the movement of each spacer 126 as it moves and contacts the wall of the pipeline does not affect the movement of adjacent spacers 126.

Figure 20:
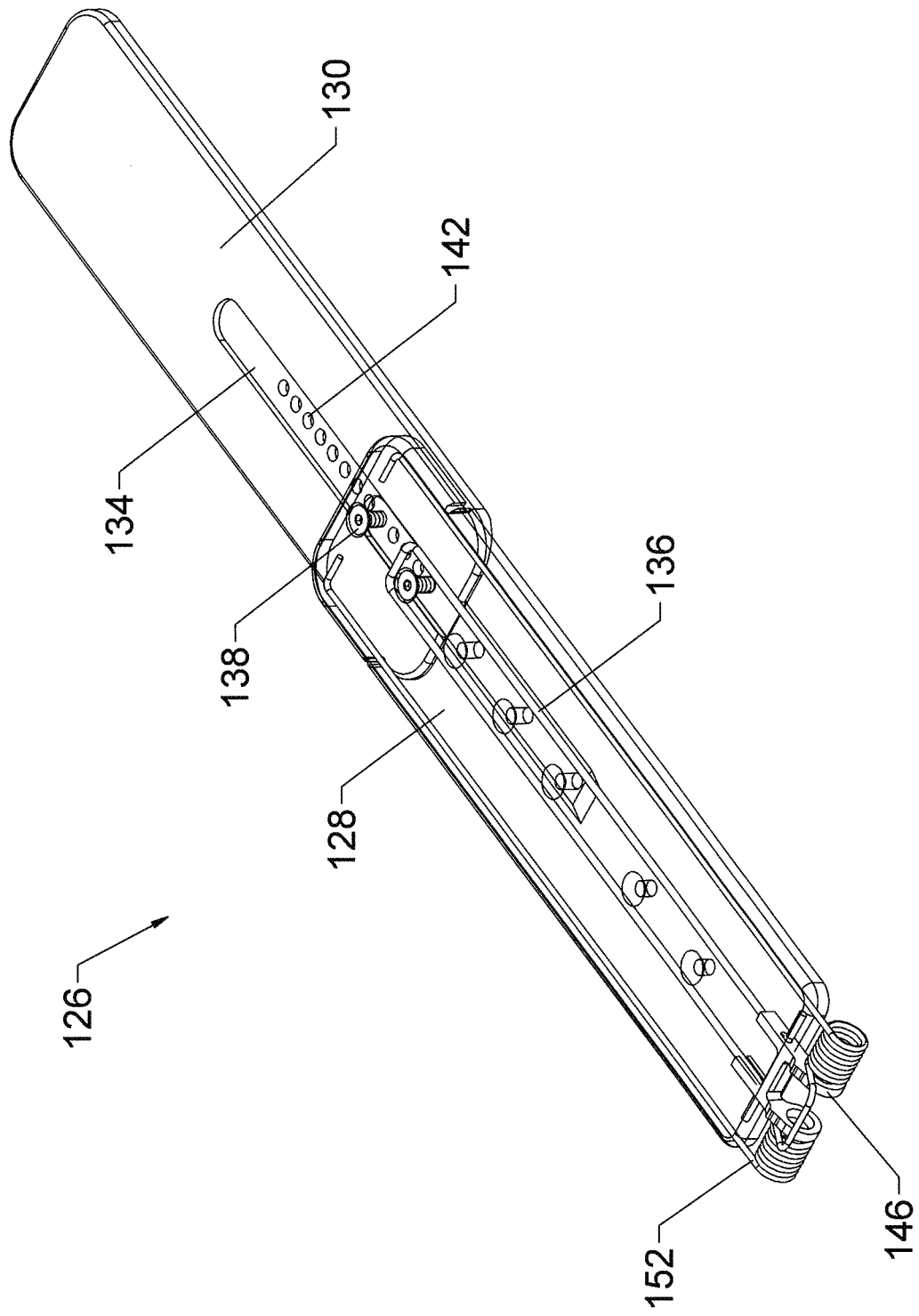
FIG. 20 shows a top perspective view of the support petals of the device of FIG. 15.
Figure 21:
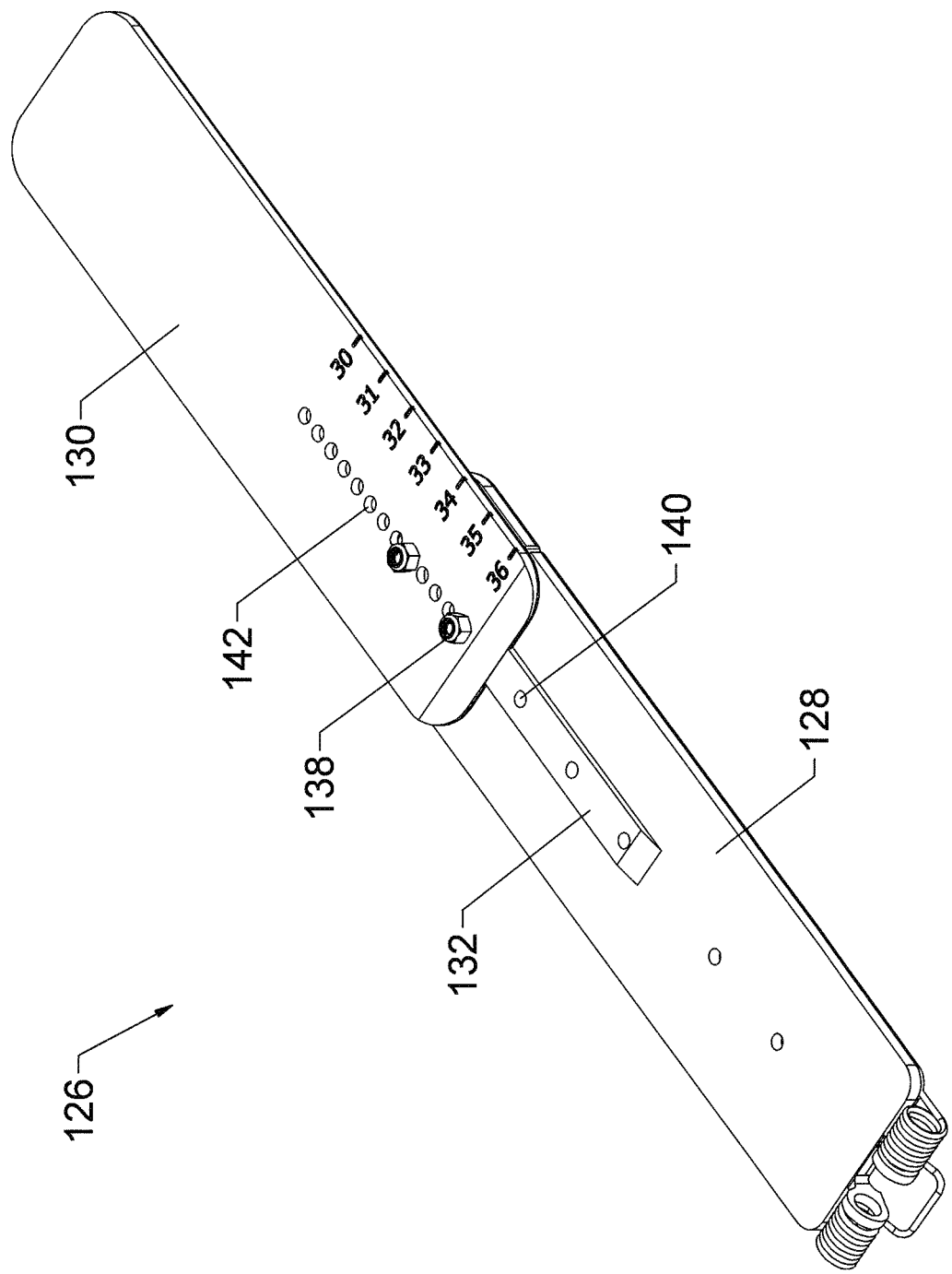
FIG. 21 shows a bottom perspective view of the support petals of FIG. 20.
Figure 22:
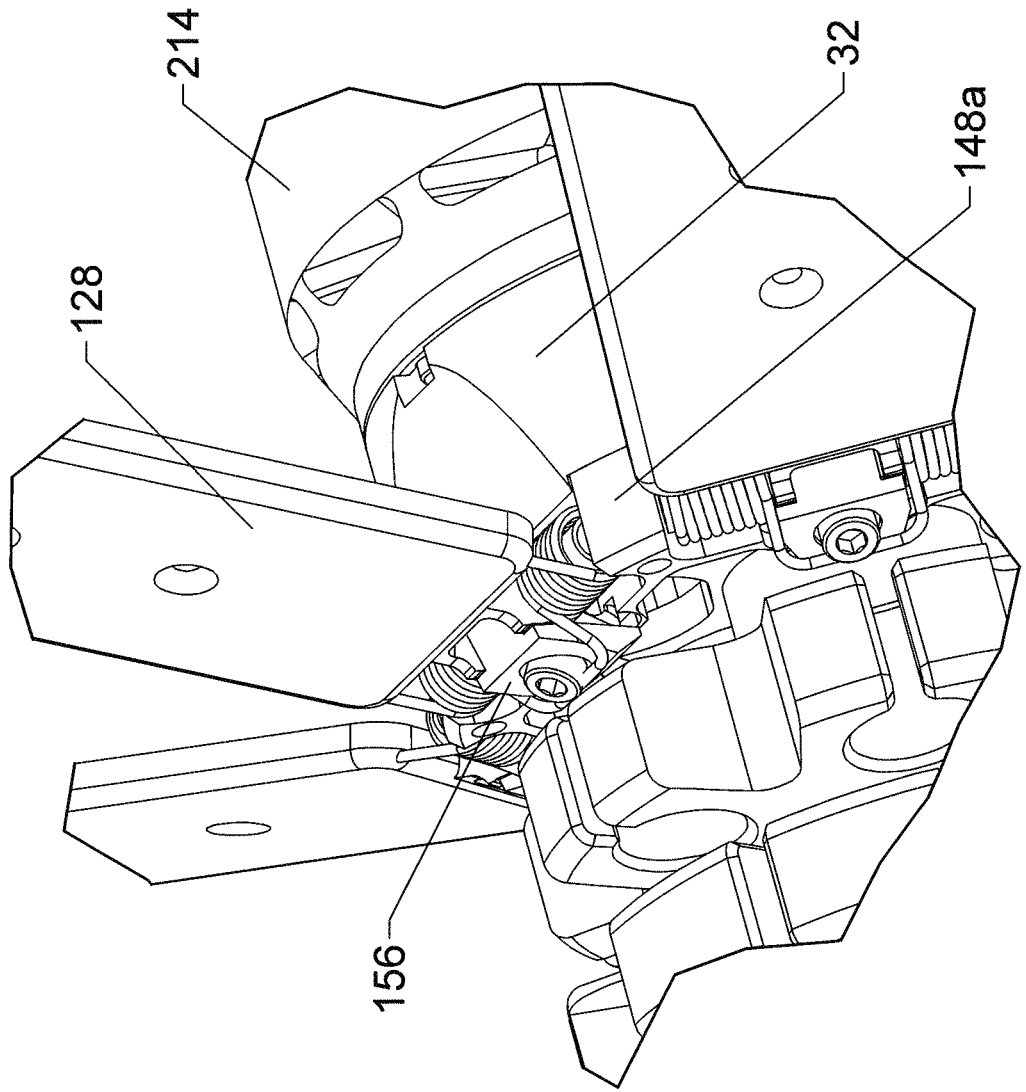
FIG. 22 shows a perspective view of the front petal plate and stopper.
Figure 23:
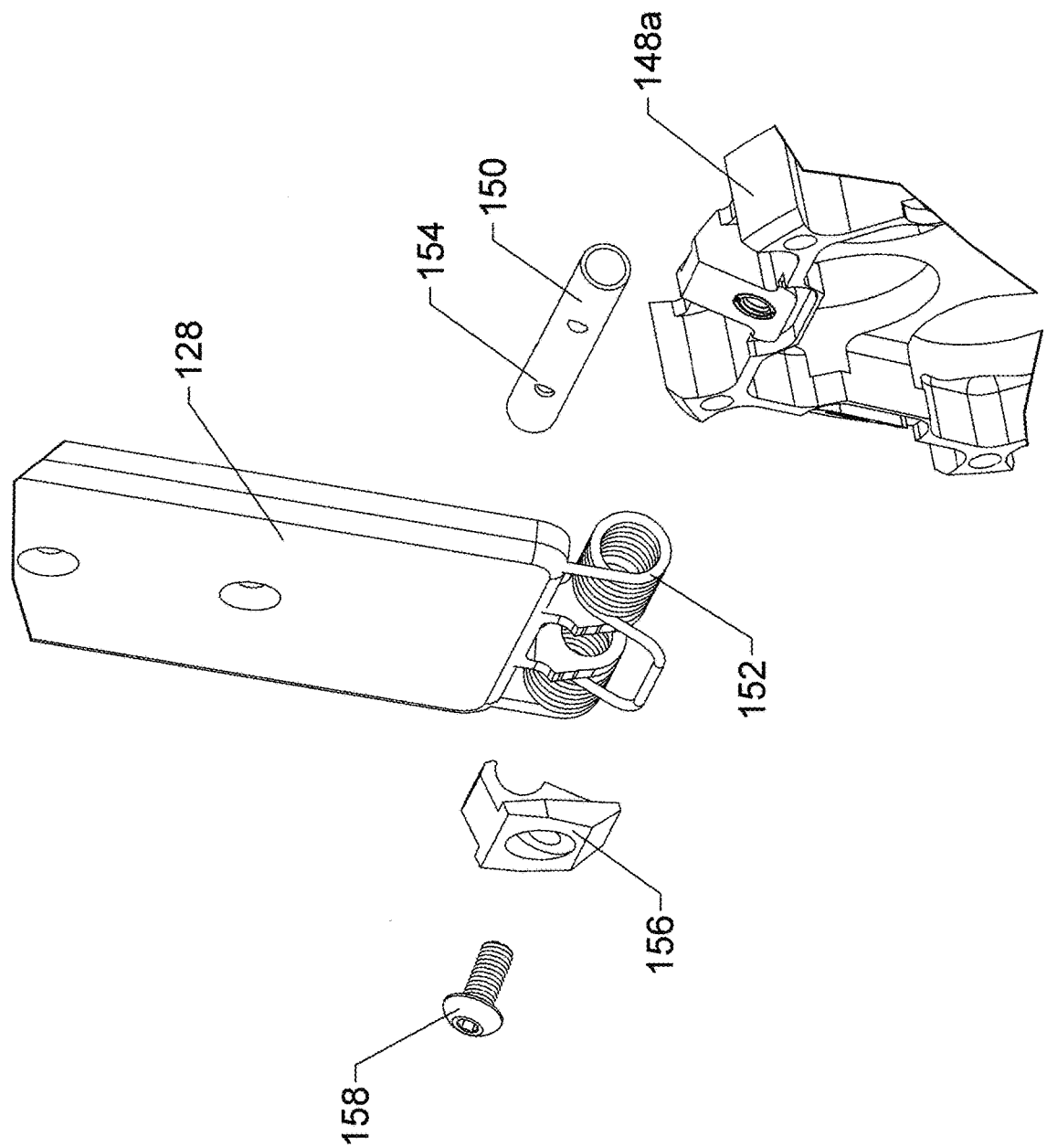
FIG. 23 shows an exploded view of the front petal plate and stopper of FIG. 21 in isolation from device of FIG. 15.
Figure 24:
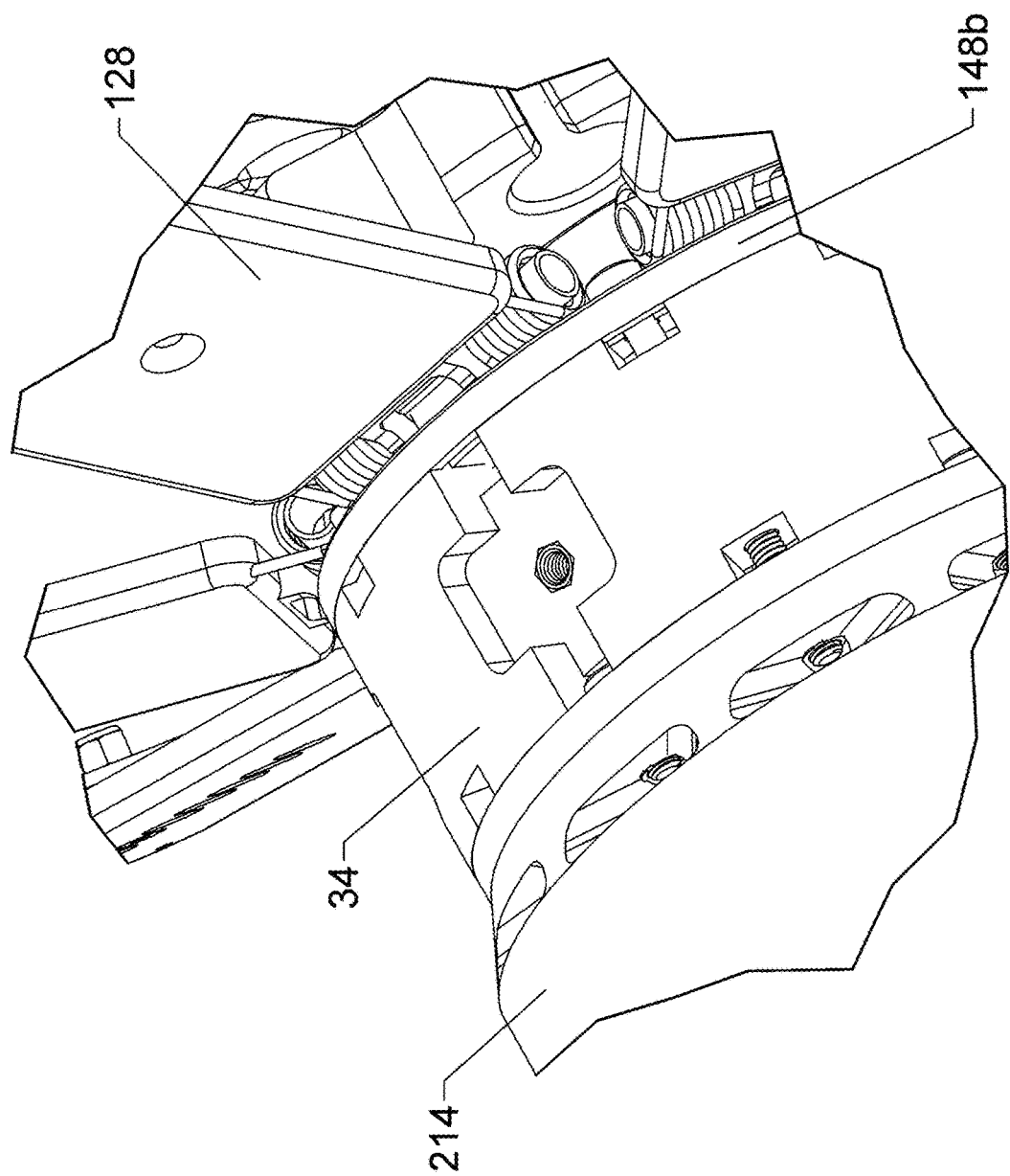
FIG. 24 shows a perspective view of the rear petal plate and stopper.
Figure 25:
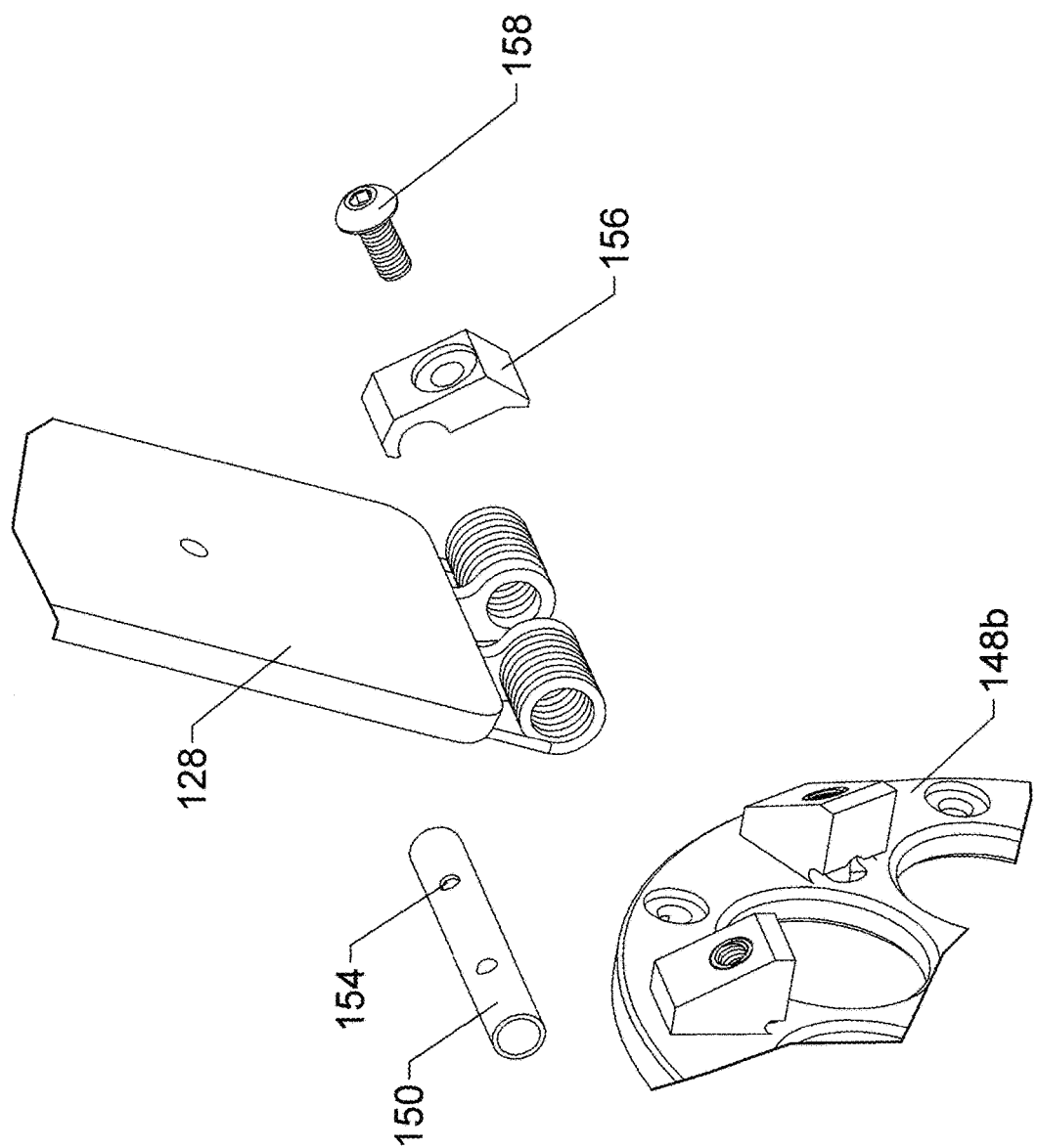
FIG. 25 shows an exploded view of the rear petal plate and stopper of FIG. 24 in isolation from device of FIG. 15.

As shown in FIGS. 20 and 21, spacers 126 are elongated structures including a first member 128 and a second member 130 moveably secured to the first member 128. The first member 128 can be understood as comprising an over molded urethane over a wire scaffold base petal including a pivot wire 136 that provides stiffness and a surface upon which the urethane mold can secure to avoid delamination. The second member 130 can be understood as comprising a polypropylene copolymer petal.

The first member 128 and the second member 130 include mutually cooperating structures that permit slideable lengthwise movement therebetween and these mutually cooperating structures have structural strength to counteract lateral forces acting on the spacer 126. First member 128 includes a key 132 which is an elongated protrusion and the second member 130 includes a keyway 134 dimensioned for receiving the key 132 therein. Locking screws 138 are provided to connect the first member 128 to the second member 130 via mounting holes 140 and 142 once the desired length of spacer 126 is attained. The desired length can be any length that is suitable with different diameter pipelines to be inspected. In one aspect, the length can be incrementally adjustable from 24-36" diameter in about 0.5" increments. In other aspects, the length can range sets from 18-24" and 36-48". Both or either the first member 128 or the second member 130 can include pipe diameter indicia 144 to easily identify the adjusted final length of the spacer 126.

As shown in FIG. 15, the first member 128 is pivotally secured to the apparatus 10 via a connection to the module 12 and/or module 14. The first member 128 is pivotally secured to move the spacer 126 between an extended position away from the apparatus 10 and a collapsed position close to the apparatus 10.

As shown in FIGS. 20 to 25, the first member 128 is connected to the apparatus 10 at a pivot joint 146 formed via a connection to a spacer base 148. The spacer base 148 comprises a circular plate (a forward plate 148a and a rear plate 148b) securable to each of the ends, respectively, of the module 12 and/or module 14. An anchor pin 150 is used to secure one end of a spring 152 in the first member 128 to the spacer base 148. The anchor pin further comprises air bleed holes 154. A stopper 156 is configured to restrict movement of the spacer 126 beyond the extended position wherein the spring 152 is oversprung to generate a pre-load force sufficient move the spacer 126 beyond the extended position in the absence of the stopper 156 into the extended position. Screws 158 secure the stopped 156 to the spacer base 148. In one aspect, the extended position is about 75 degrees from the longitudinal axis of the apparatus 10 which help maintain the apparatus 10 and the ultrasonic module 14 and transducers 28 to maintain about the 1.5% centralization with the pipeline.

It has been demonstrated that the provision of the adjustable pre-loaded supports 124 provides a larger balancing level tolerance and can eliminate the effects of urethane saturation and trapper air on the apparatus' centering ability while travelling in the liquid-filled pipeline.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. Any dimensions provided in the drawings are provided for illustrative purposes only and are not intended to be limiting on the scope of the invention. The subject matter described herein and in the recited claims intends to cover and embrace all suitable changes in technology.

The invention claimed is:

1. An ultrasonic module for use in a pipeline inspection apparatus, the module comprising:
   a plurality of ultrasonic transducers configured to assess a condition of a pipeline; and an elongate body including a front end and a rear end opposed to the front end, the body configured to mount the plurality of ultrasonic transducers around a circumference of the elongate body aligned along adjacent transverse planes wherein the plurality of ultrasonic transducers aligned along one transverse plane are rotationally offset from the plurality of ultrasonic transducers aligned along an adjacent transverse plane, wherein a wall of the elongate body defines a plurality of apertures, each one aperture dimensioned to receive at least one ultrasonic transducer therein.

2. The ultrasonic module of claim 1 wherein the ultrasonic transducers are rotationally offset from the ultrasonic transducers in the adjacent transverse plane from about 2.5 degrees to about 5 degrees to increase density of mounted ultrasonic transducers.

3. The ultrasonic module of claim 2 wherein the transverse planes are separated to reduce signal overlap or reduce cross talk between ultrasonic sensors.

4. The ultrasonic module of claim 3 wherein each one of the transverse plane includes 10 to 20 ultrasonic transducers.

5. The ultrasonic module of claim 4 wherein the adjacent transverse planes are separated by about 0.5" to 1.5".

6. The ultrasonic module of claim 5 wherein the adjacent transverse planes are separated by about 1" to 1.1".

7. The ultrasonic module of claim 4 wherein each of the adjacent transverse planes includes 16 ultrasonic transducers.

8. The ultrasonic module of claim 2 wherein the ultrasonic transducers are rotationally offset from the ultrasonic transducers in the adjacent transverse plane by about 3.75 degrees to increase density of mounted ultrasonic transducers.

9. The ultrasonic module of claim 3 wherein the adjacent transverse planes include 4 to 8 adjacent transverse planes.

10. The ultrasonic module of claim 1 further comprising one or more seals between the wall of the elongate body and the ultrasonic transducer.

11. The ultrasonic module of claim 10 wherein each one of the one or more seals are seated within a groove defined in an outside surface of the wall or the one or more seals are seated within the aperture.

12. The ultrasonic module of claim 11 wherein, when the one or more seals are seated within the aperture, the ultrasonic transducer contacts the outside surface of the wall via a grooved surface formed on the ultrasonic transducer or a grooved surface the outside surface of the wall.

13. The ultrasonic module of claim 1 further comprising a retainer comprising a hollow cylinder configured to enclose and protect the ultrasonic transducers from impacts.

14. The ultrasonic module of claim 1 further comprising a guard having a forward portion, a rear portion, and a main portion between the forward and rear portions, the main portion defining a plurality of transducer apertures dimensioned to receive the plurality of transducers therethrough to shield the plurality of ultrasonic transducers from impact.

15. The ultrasonic module of claim 14 wherein the guard further comprises air bleed holes between one or more of the forward portion, the rear portion, and the main portion to reduce air from being trapped when the ultrasonic module is immersed in liquid.

16. The ultrasonic module of claim 15 wherein the forward and rear portions have a tapered profile.

17. A pipeline inspection apparatus for inspecting a condition of a pipeline when deployed into a pipeline containing a liquid, the apparatus comprising:

an ultrasonic module comprising a plurality of ultrasonic transducers configured to assess the condition of a pipeline; and a plurality of wall spacers circumferentially emplaced around the ultrasonic module, the wall spacers configured to moveably contact the wall of the pipeline and maintain the ultrasonic module to within about 1% to about 3% of a diameter of the pipeline;

wherein the ultrasonic module includes an elongate body including a front end and a rear end opposed to the front end, the body configured to mount the plurality of ultrasonic transducers around the circumference of the elongate body aligned along adjacent transverse planes wherein the plurality of ultrasonic transducers aligned along one transverse plane are rotationally offset from the plurality of ultrasonic transducers aligned along an adjacent transverse plane; and wherein a wall of the elongate body defines a plurality of apertures, each one aperture dimensioned to receive at least one ultrasonic transducer therein.

18. The apparatus of claim 17 wherein the plurality of circumferentially spaced wall spacers are pivotally secured to the elongate body to permit the plurality of circumferentially spaced wall spacers to pivotally move between an extended position away from the elongate body and a collapsed position close to the elongate body.

19. The apparatus of claim 18 wherein the plurality of circumferentially spaced wall spacers are biased into the extended position.

20. The apparatus of claim 19 wherein the extended position is about 75 degrees from a longitudinal axis of the elongate body.

21. An apparatus for detecting flaws in a wall of a pipeline containing a fluid, comprising:

a plurality of ultrasonic sensors for assessing a condition of the pipeline, the plurality of sensors configured to be distributed around a surface of an ultrasonic module; and a plurality of wall spacers circumferentially positioned around the surface of the ultrasonic module, the wall spacers configured to moveably contact a wall of the pipeline, wherein the plurality of circumferentially spaced wall spacers are pivotally secured to an elongate body of the ultrasonic module to permit the plurality of circumferentially spaced wall spacers to pivotally move between an extended position away from the elongate body and a collapsed position close to the elongate body.

\* \* \* \* \*